(12) United States Patent
Yamada et al.

(10) Patent No.: US 8,337,313 B2
(45) Date of Patent: Dec. 25, 2012

(54) COMPUTER-READABLE STORAGE MEDIUM HAVING GAME PROGRAM STORED THEREIN, GAME APPARATUS, GAME SYSTEM, AND GAME PROCESSING METHOD

(75) Inventors: Yoichi Yamada, Kyoto (JP); Hidemaro Fujibayashi, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 112 days.

(21) Appl. No.: 12/952,791

(22) Filed: Nov. 23, 2010

(65) Prior Publication Data
US 2011/0287843 A1  Nov. 24, 2011

(30) Foreign Application Priority Data

May 19, 2010  (JP) ................................. 2010-115795

(51) Int. Cl.
*G06F 17/00* (2006.01)
(52) U.S. Cl. ....................................................... 463/43
(58) Field of Classification Search .............. 463/16–25, 463/40–43
See application file for complete search history.

(56) References Cited

U.S. PATENT DOCUMENTS

| | | | | |
|---|---|---|---|---|
| 5,565,870 A | * | 10/1996 | Fukuhara et al. ................ | 342/70 |
| 2006/0258445 A1 | * | 11/2006 | Nishimori et al. ............... | 463/30 |
| 2008/0039200 A1 | * | 2/2008 | Yoshida ........................... | 463/37 |
| 2008/0227543 A1 | * | 9/2008 | Kawase et al. ................... | 463/31 |
| 2010/0160045 A1 | * | 6/2010 | Yamada et al. .................. | 463/37 |
| 2010/0306717 A1 | * | 12/2010 | Yamada et al. ................ | 715/863 |

FOREIGN PATENT DOCUMENTS

| | | |
|---|---|---|
| JP | 4009433 | 9/2007 |
| JP | 2008-173345 | 7/2008 |

* cited by examiner

*Primary Examiner* — Ronald Laneau
(74) *Attorney, Agent, or Firm* — Nixon & Vanderhye P.C.

(57) ABSTRACT

Angular velocity data for specifying the position and the orientation of the first controller is inputted to a game apparatus. Based on the angular velocity data, the swing direction of the first controller is determined, and whether or not a sword object that acts in a virtual game space will collide with an enemy object is determined. If it has been determined that the sword object will collide with the enemy object, whether or not to perform hitting processing for the enemy object is determined based on the swing direction of the first controller.

15 Claims, 26 Drawing Sheets

F I G. 1
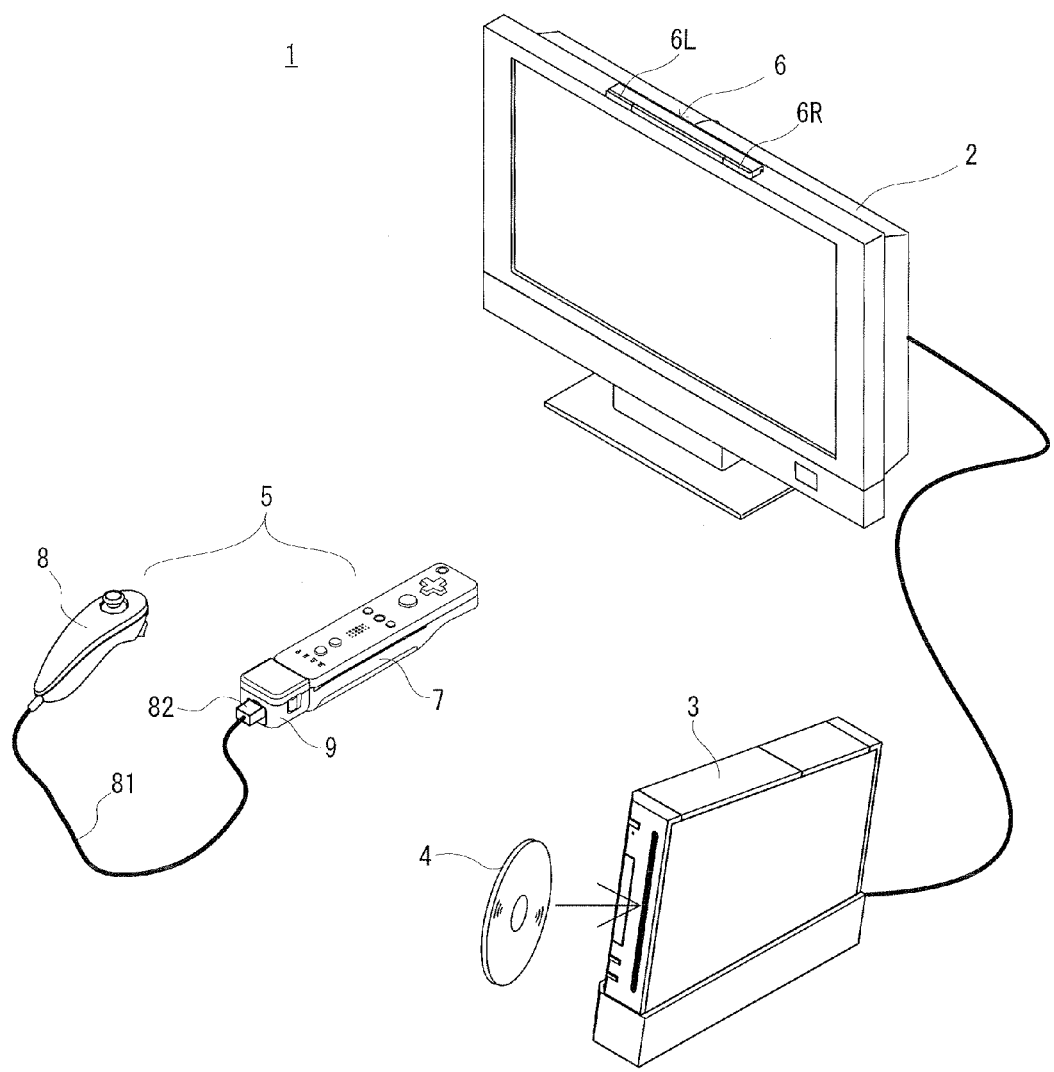

F I G. 2
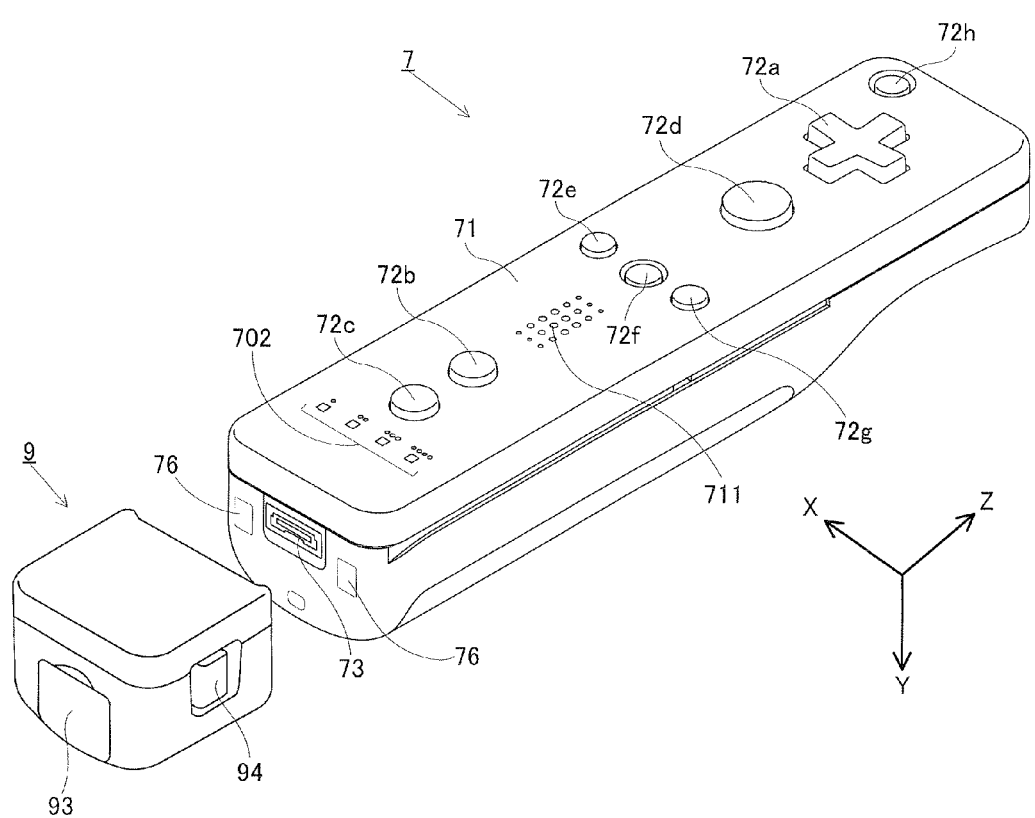

F I G. 5
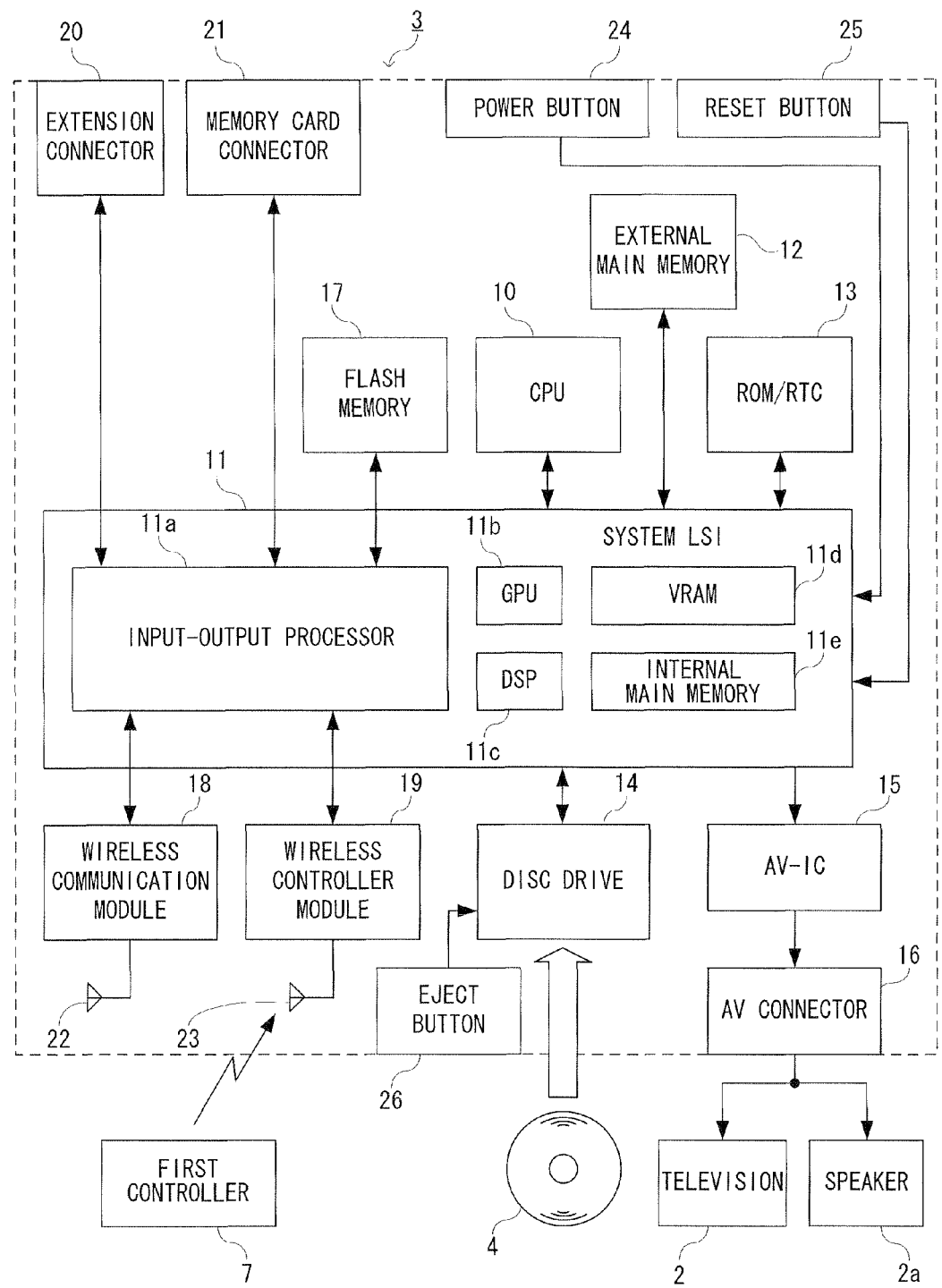

F I G. 10
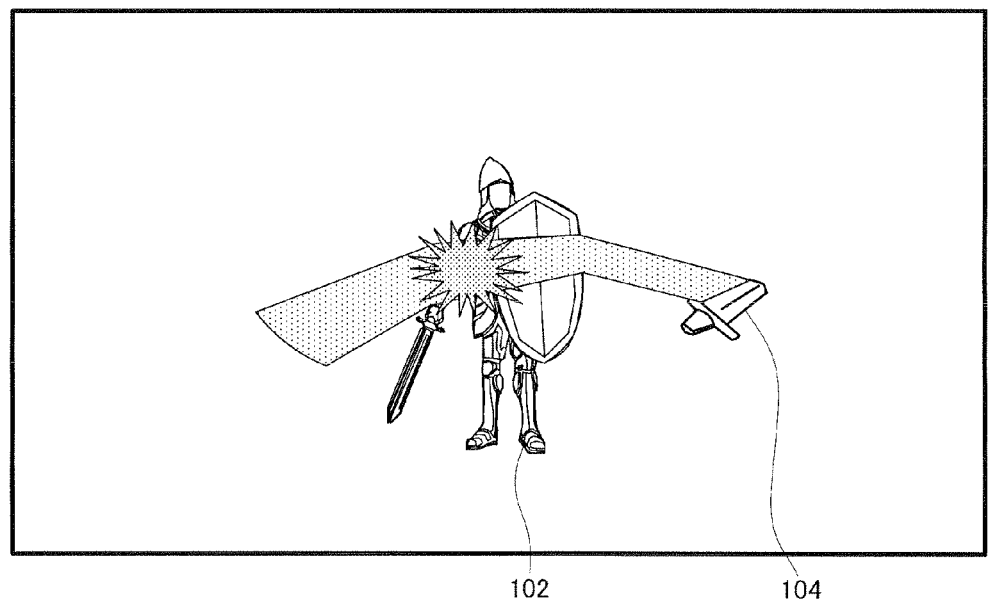
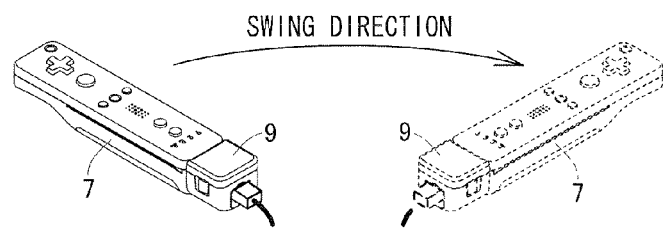

F I G. 11
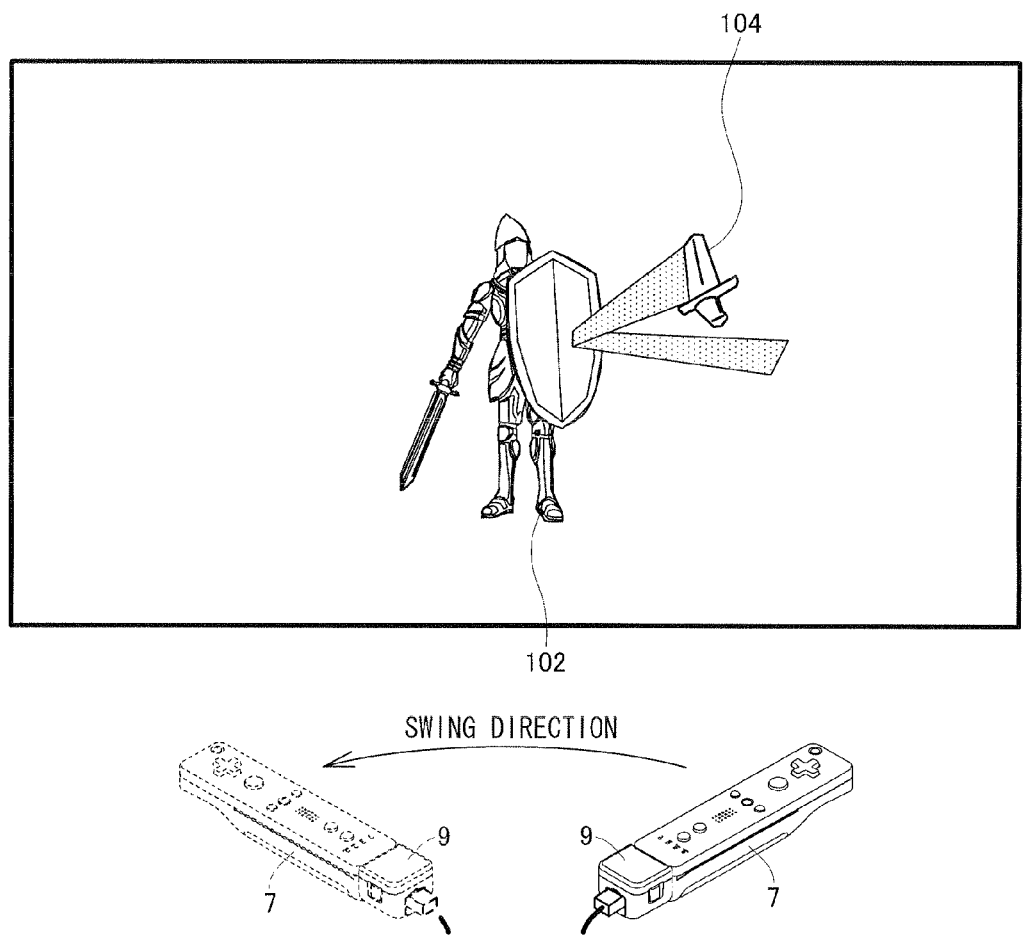

F I G. 15
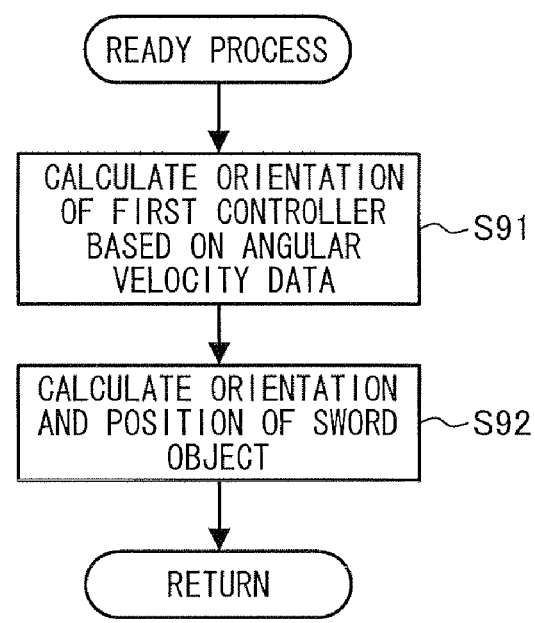

F I G. 16
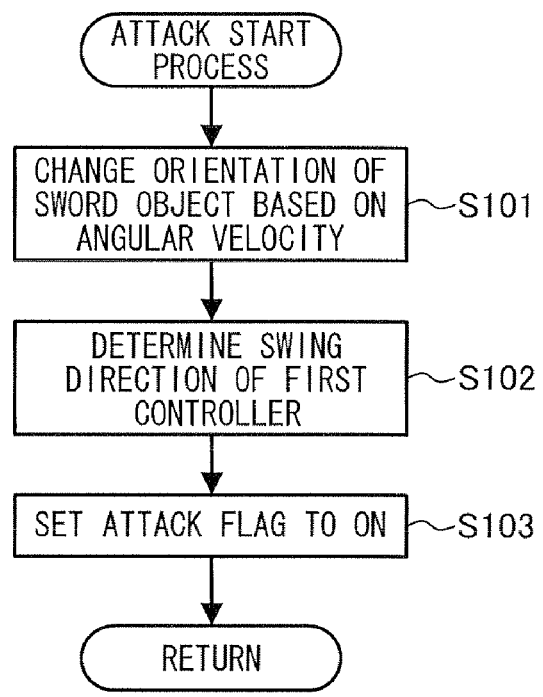

F I G. 18
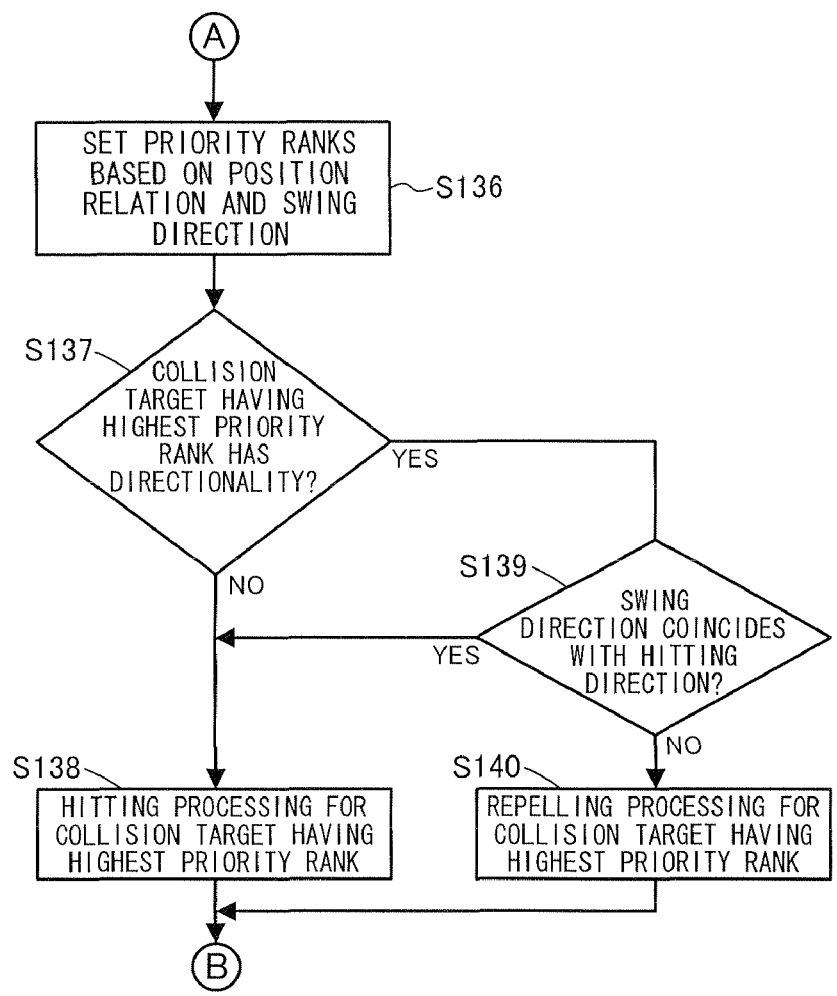

F I G. 19
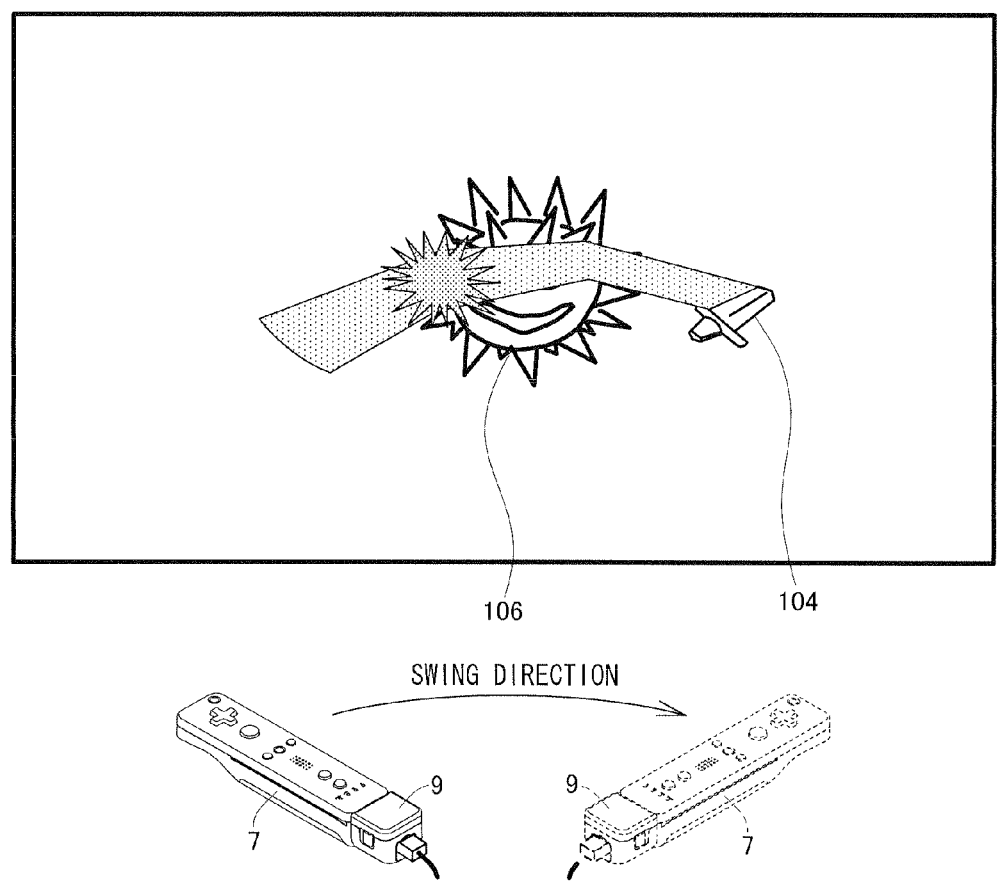

104  102
106

SWING DIRECTION 102   106   104

SWING DIRECTION

F I G. 24
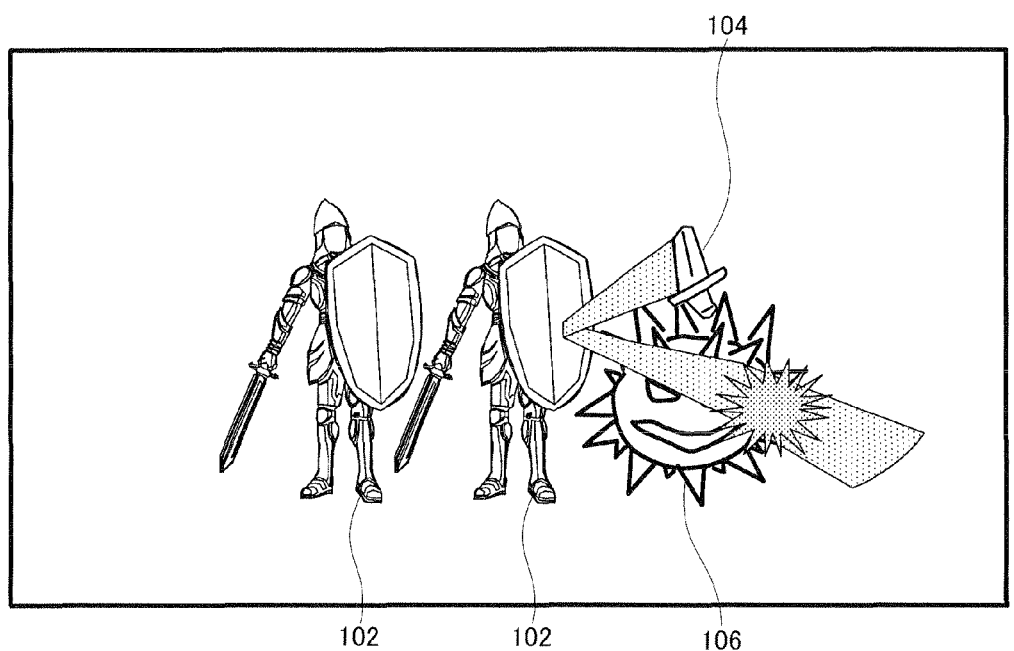
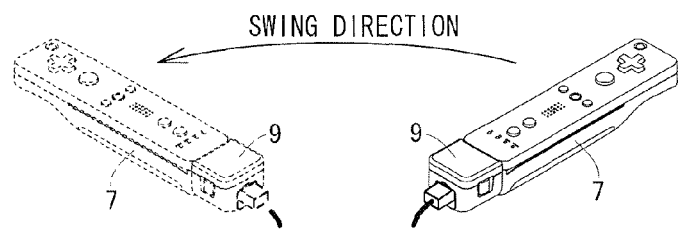

F I G. 25
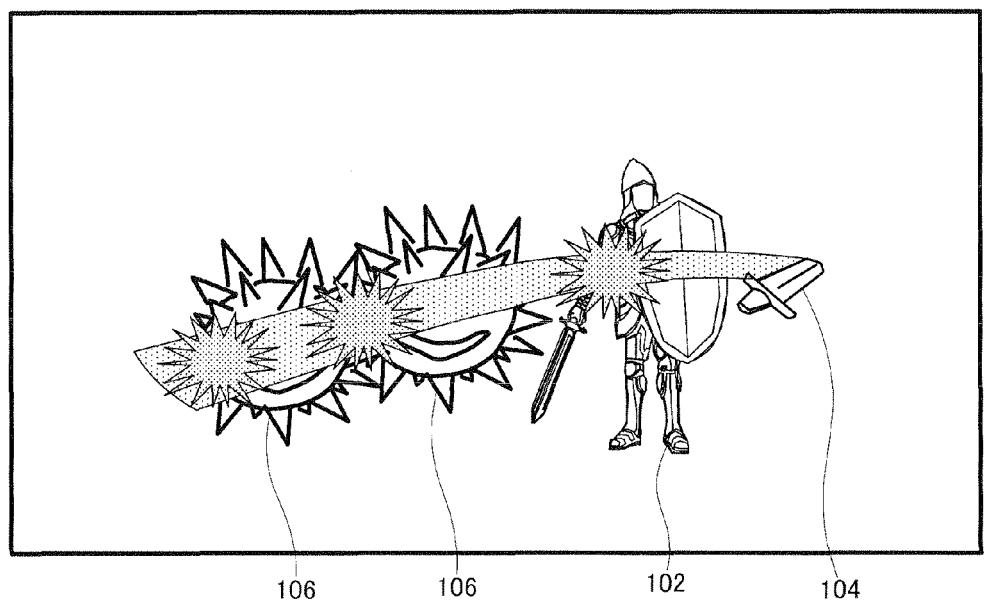
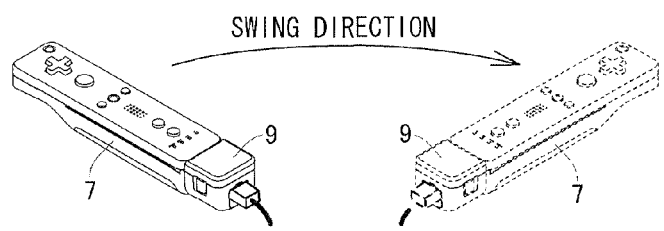

F I G. 26
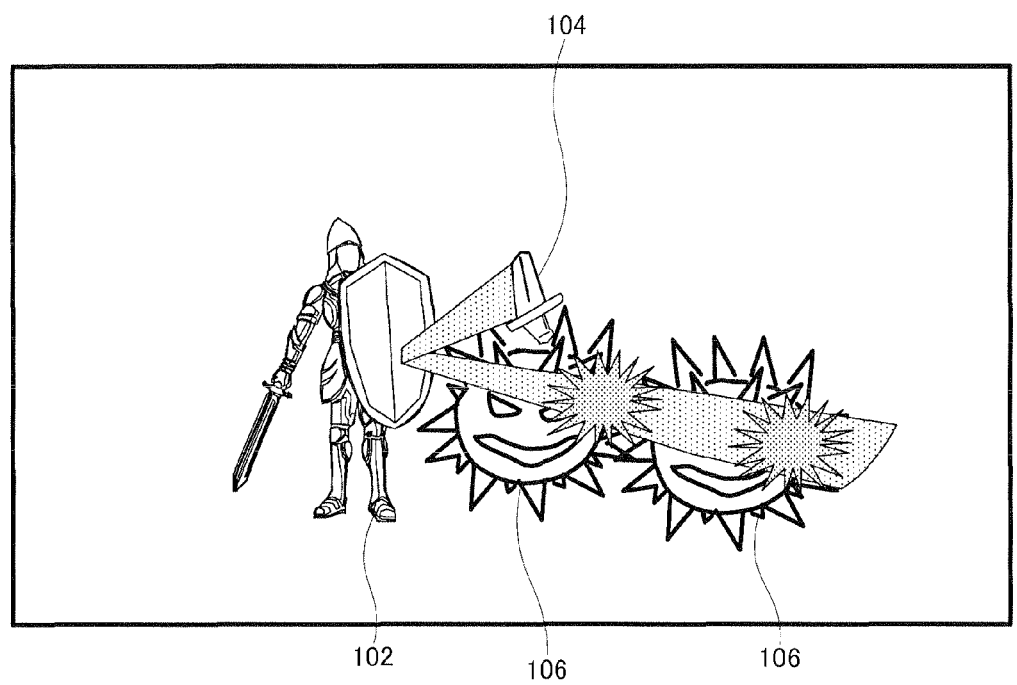
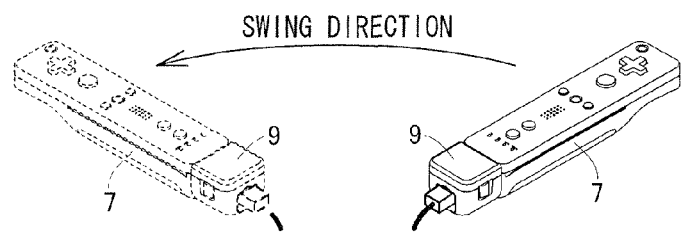

COMPUTER-READABLE STORAGE MEDIUM HAVING GAME PROGRAM STORED THEREIN, GAME APPARATUS, GAME SYSTEM, AND GAME PROCESSING METHOD

CROSS REFERENCE TO RELATED APPLICATION

The disclosure of Japanese Patent Application No. 2010-115795, filed on May 19, 2010, is incorporated herein by reference.

BACKGROUND

1. Field

Example embodiments of the present invention relate to: a computer-readable storage medium having stored therein a game program which is executed by a computer of a game apparatus; a game apparatus; a game system; and a game processing method, and more particularly, to: a computer-readable storage medium having stored therein a game program which is executed by a computer of a game apparatus which determines a collision between objects in a virtual game space and performs game processing in accordance with a result of the determination; a game apparatus; a game system; and a game processing method.

2. Description of the Background Art

In a so-called shooting game or action game, a player object that appears in a virtual game space is moved in accordance with the movement of a controller operated by a player, and collision determination that determines whether or not the player object has collided with another object is performed (see, for example, Japanese Laid-Open Patent Publication No. 2008-173345, and Japanese Patent No. 4009433).

A game apparatus disclosed in Japanese Laid-Open Patent Publication No. 2008-173345 detects the movement of a controller, based on acceleration data outputted from an acceleration sensor included in the controller, and reflects the detected movement in game processing. Specifically, if the player has swung the controller, a sword object (player object) in a virtual game space is swung in the direction corresponding to the swing direction of the controller. At this time, whether or not the sword object has collided with a log object is determined. Then, if it has been determined that the sword object has collided with the log object, the log object is cut in the direction corresponding to the swing direction.

A game apparatus disclosed in Japanese Patent No. 4009433 includes a CCD camera for detecting the position of a controller. The controller has an LED that emits infrared light. The game apparatus detects the position of the controller by detecting the infrared light by using the CCD camera, and reflects a result of the detection in game processing. Specifically, if the player has swung the controller, an action of a sword object in a virtual game space such as swinging the sword or lunging with the sword is displayed on a screen. Along with this, whether or not the sword object has collided with, for example, an enemy object is determined. Then, if it has been determined that the sword object has collided with the enemy object, the degree of collision is determined based on the speed of the sword object, and which portion of the sword object has collided with the enemy object. Here, the determination of the degree of collision is to determine, in accordance with an action of the sword object, which the collision results in that "only clothes have been cut", "flesh of the enemy object has been cut", or "the enemy object has been cut to the bone".

Here, the conventional game apparatuses described above realistically represent a response made at the time when the sword object has collided with another object, based on the movement of the controller. However, the conventional game apparatuses cannot easily switch, in accordance with the swing direction (operation direction) of the controller, the representation indicating a response made at the time when a colliding object such as the sword object has collided with an object to be collided such as a log or an enemy.

SUMMARY OF THE INVENTION

Therefore, example embodiments of the present invention is to provide: a computer-readable storage medium having stored therein a game program that makes it possible to easily switch a representation indicating a response of an object to be collided with, in accordance with an operation direction of an input apparatus; a game apparatus; a game system; and a game processing method.

A computer-readable storage medium having stored therein a game program according to example embodiments of the present invention causes a computer of a game apparatus to function as direction determination means; collision determination means; and collision processing determination means, which game apparatus performs game processing, based on a state signal outputted by state detection means for detecting at least one of the position or the orientation of an input apparatus. The direction determination means determines an operation direction of the input apparatus, based on the state signal. The collision determination means determines whether or not a first object that acts based on the state signal in a virtual game space will collide with a determination target. The collision processing determination means, if the collision determination means has determined that the first object will collide with the determination target, determines whether or not to perform hitting processing for the determination target, based on the operation direction determined by the direction determination means.

The state of the input apparatus operated by the player is detected by the state detection means. The state signal that is a result of the detection performed by the state detection means is inputted to the game apparatus. Based on the state signal, the game apparatus performs game processing of moving a first object in a virtual game space operated by the player, or changing the orientation of the first object. It is noted that by the player changing the position and the orientation of the input apparatus, the state signal inputted to the game apparatus is changed. Therefore, by monitoring the change in the state signal, an operation by the player of changing the position and the orientation of the input apparatus can be accurately reflected in the position and the orientation of the first object.

In such game processing, the game apparatus causes the collision determination means to execute collision determination of determining whether or not the first object will collided with a determination target. Here, the determination target is a determination area set for a so-called non-player object such as an enemy object with which the first object might collide in the virtual game space, or a weapon that the enemy object has. In addition to the collision determination, the game apparatus determines an operation direction of the input apparatus (a direction in which the input apparatus has been moved), based on the state signal. If the collision determination means has determined that the first object will collide with the determination target, the collision processing determination means determines whether or not to perform hitting processing for the determination target, based on the determined operation direction of the input apparatus. Here, the hitting processing is processing for displaying, on a screen, a representation indicating that the first object has hit at the determination target. If it has been determined that the hitting processing is to be performed, for example, an animation indicating a scene in which a sword object that is the first object hits at the enemy object and the enemy object is damaged is displayed on the screen. On the other hand, if it has been determined that the hitting processing is not to be performed, for example, an animation indicating a scene in which the sword object that is the first object is repelled by the enemy object is displayed on the screen.

The game program may further cause the computer to function as position relation detection means for detecting a position relation between the first object and the determination target in the virtual game space. In this case, the collision processing determination means determines whether or not to perform the hitting processing for the determination target, based on the operation direction determined by the direction determination means, and the position relation detected by the position relation detection means.

In this configuration, whether or not to perform the hitting processing for the determination target is determined in consideration of the position relation between the first object and the determination target, in addition to the operation direction of the input apparatus. Therefore, even if the position relation between the first object and the determination target has changed, whether or not to perform the hitting processing for the determination target can be appropriately determined.

The game program may further cause the computer to function as priority rank setting means for, if the collision determination means has determined that the first object will collide with a plurality of determination targets, setting priority ranks for the plurality of determination targets, based on the operation direction determined by the direction determination means, and the position relation detected by the position relation detection means. In this case, the collision processing determination means determines whether or not to perform the hitting processing for a determination target having the highest priority rank among the plurality of determination targets.

This configuration makes it possible to, for example, set priority ranks such that, among the plurality of determination targets, a priority rank of the determination target that the first object will first collide with is the highest, and to determine whether or not to perform the hitting processing for the determination target having the highest priority rank. Therefore, whether or not to perform the hitting processing can be appropriately determined for a determination target for which whether or not to perform the hitting processing should be determined.

The game program may further cause the computer to function as start determination means for determining whether or not an operation of swinging the input apparatus has been started, based on the state signal. In this case, the direction determination means determines the operation direction of the input apparatus when the start determination means has determined that an operation of swinging the input apparatus has been started.

This configuration makes it possible to determine whether or not to perform the hitting processing for the determination target, at an earlier timing than in the case where the operation direction of the input apparatus is determined when the first object has collided with the determination target. As a result, a time lag from when an operation of swinging the input apparatus is started, to when a representation upon collision is displayed on the screen, is reduced.

The state detection means may include an angular velocity sensor, and the state signal may include angular velocity data outputted by the angular velocity sensor.

This configuration makes it possible to perform more accurately the determination of the operation direction of the input apparatus, and the determination of whether or not the first object will collide with the determination target, than in the case of using, for example, an acceleration sensor as the state detection means. As a result, whether or not to perform the hitting processing for the determination target is more accurately determined.

The present invention may be realized as a game apparatus which performs game processing, based on a state signal outputted by state detection means for detecting at least one of the position or the orientation of an input apparatus. The game apparatus comprises: direction determination means; collision determination means; and collision processing determination means. The direction determination means determines an operation direction of the input apparatus, based on the state signal. The collision determination means determines whether or not a first object that acts based on the state signal in a virtual game space will collide with a determination target. The collision processing determination means, if the collision determination means has determined that the first object will collide with the determination target, determines whether or not to perform hitting processing for the determination target, based on the operation direction determined by the direction determination means.

Example embodiments of present invention may be realized as a game apparatus which performs game processing, based on a state signal outputted by state detection means for detecting at least one of the position or the orientation of an input apparatus. The game apparatus comprises: direction determination means; collision determination means; and collision processing determination means. The direction determination means determines an operation direction of the input apparatus, based on the state signal. The collision determination means determines whether or not a first object that acts based on the state signal in a virtual game space will collide with a determination target. The collision processing determination means, if the collision determination means has determined that the first object will collide with the determination target, determines whether or not to perform hitting processing for the determination target, based on the operation direction determined by the direction determination means.

In addition, example embodiments of the present invention may be realized as a game system which performs game processing, based on a state signal outputted by state detection means for detecting at least one of the position or the orientation of an input apparatus. The game system comprises: direction determination means; collision determination means; and collision processing determination means. The direction determination means determines an operation direction of the input apparatus, based on the state signal. The collision determination means determines whether or not a first object that acts based on the state signal in a virtual game space will collide with a determination target. The collision processing determination means, if the collision determination means has determined that the first object will collide with the determination target, determines whether or not to perform hitting processing for the determination target, based on the operation direction determined by the direction determination means.

In addition, example embodiments of the present invention may be realized as a game processing method in which, for example, a computer of a game apparatus performs game processing, based on a state signal outputted by state detection means for detecting at least one of the position or the orientation of an input apparatus. The game processing method determines an operation direction of the input apparatus, based on the state signal. In addition, the game processing method determines whether or not a first object that acts based on the state signal in a virtual game space will collide with a determination target. Moreover, the game processing method, if the collision determination means has determined that the first object will collide with the determination target, determines whether or not to perform hitting processing for the determination target, based on the operation direction that has been determined.

It is noted that the determination of the operation direction of the input apparatus may be performed before the collision determination of whether or not the first object will collide with the determination target, or may be performed after the collision determination.

In example embodiments of the present invention, since whether or not to perform the hitting processing for the determination target is determined in accordance with the operation direction of the input apparatus, it is possible to easily switch a representation indicating a response of an object to be collided with, in accordance with the operation direction of the input apparatus.

These and other features, aspects and advantages of example embodiments of the present invention will become more apparent from the following detailed description of example embodiments of the present invention when taken in conjunction with the accompanying drawings.

BRIEF DESCRIPTION OF THE DRAWINGS

FIG. 1 is a perspective view of an external configuration of a game system 1 including a game apparatus 3 according to one embodiment of the present invention;

FIG. 2 is a perspective view of a first controller 7 and a gyro sensor unit 9 as seen from a top rear side thereof;

FIG. 5 is a block diagram showing a configuration of the game apparatus 3;

FIG. 10 is a screen diagram showing an example of an animation displayed on the liquid crystal television 2 when the player has swung the first controller 7 from left to right;

FIG. 11 is a screen diagram showing an example of an animation displayed on the liquid crystal television 2 when the player has swung the first controller 7 from right to left;

FIG. 15 is a flowchart showing, in detail, ready processing in step S9 in FIG. 13;

FIG. 16 is a flowchart showing, in detail, attack start processing in step S10 in FIG. 13;

FIG. 18 is a flowchart showing in detail the collision determination processing in step S12 in FIG. 13;

FIG. 19 is a screen view showing an example of an animation displayed on the liquid crystal television 2 in the case where the player has swung the first controller 7 from left to right;

FIG. 24 is a screen view showing an example of an animation displayed on the liquid crystal television 2 in the case where the player has swung the first controller 7 from right to left;

FIG. 25 is a screen view showing an example of an animation displayed on the liquid crystal television 2 in the case where the player has swung the first controller 7 from left to right; and FIG. 26 is a screen view showing an example of an animation displayed on the liquid crystal television 2 in the case where the player has swung the first controller 7 from right to left.

DESCRIPTION OF THE EXAMPLE EMBODIMENTS

Figure 3:
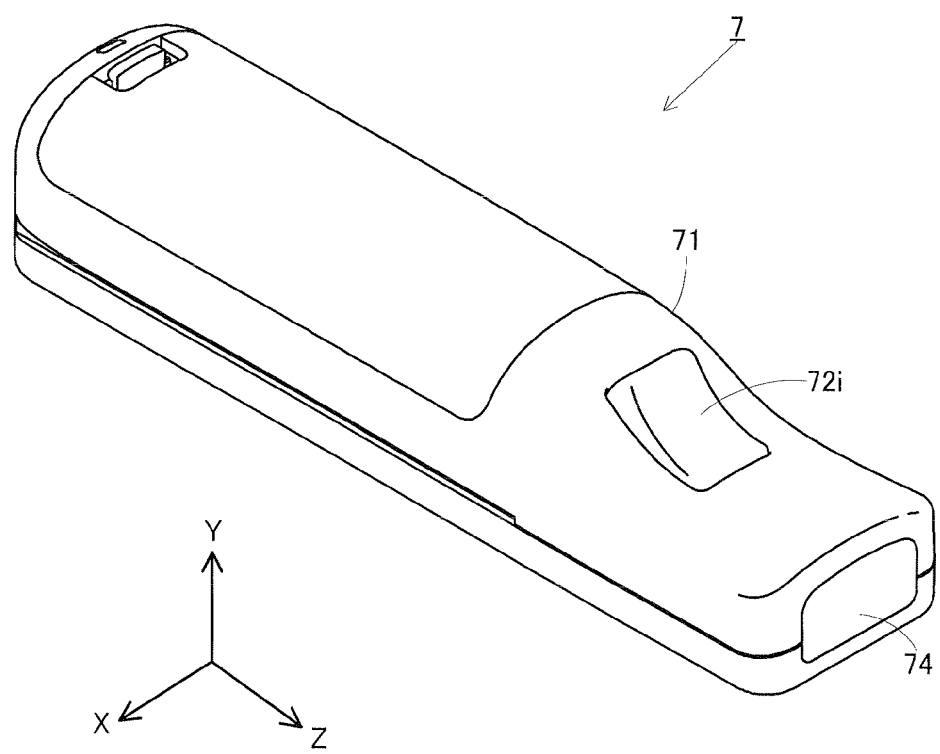
FIG. 3 is a perspective view of the first controller 7 as seen from a bottom front side thereof.

In the following, an embodiment of the present invention will be described with reference to the drawings as appropriate. FIG. 1 is an external perspective view of a game system 1 which includes a game apparatus 3 according to an embodiment of the present invention. In the present embodiment, the present invention will be described taking as an example a case where a game apparatus is the game apparatus 3 of stationary type. However, the game apparatus may be, for example, a portable type game apparatus in which a game apparatus and a display device are integrally formed.

[Whole Configuration of Game System 1]

Firstly, an overview of components of the game system 1 will be described. In FIG. 1, the game system 1 includes a liquid crystal television 2, the game apparatus 3, an optical disc 4, a marker unit 6, and a controller 5. In the game system 1, the game apparatus 3 executes a game process based on a game operation performed by a player using the controller 5.

The optical disc 4, which is an exemplary information storage medium changeable with respect to the game apparatus 3, is detachably loaded into the game apparatus 3. A game program that is executed in the game apparatus 3 is stored on the optical disc 4. On a front surface of the game apparatus 3, a slot through which the optical disc 4 is inserted is provided. The game apparatus 3 executes a game process by reading and executing the game program stored on the optical disc 4 which has been inserted through the slot.

The liquid crystal television 2 is connected via a connection cord to the game apparatus 3. As will be described later, the game apparatus 3 generates an image (hereinafter, referred to as a game image) of a virtual game space including an object seen from a viewpoint of a virtual camera placed in the virtual game space, and outputs the image to the liquid crystal television 2. This series of processes are performed in units of a frame (e.g., at intervals of 1/60 sec) in this embodiment. The liquid crystal television 2 receives a game image outputted from the game apparatus 3 in this manner, and displays the game image on a screen.

The marker unit 6 is provided in the vicinity of the screen of the liquid crystal television 2 (on an upper side of the screen in FIG. 1). The marker unit 6 comprises two markers 6R and 6L at both ends thereof. Specifically, the marker 6R includes one or more infrared LEDs that output infrared light toward the front of the liquid crystal television 2 (the same is true of the marker 6L). The marker unit 6 is connected to the game apparatus 3, so that the game apparatus 3 can control ON/OFF of each infrared LED included in the marker unit 6. The marker unit 6 is also provided with a microphone (not shown). Audio information inputted through the microphone is inputted to the game apparatus 3.

The controller 5 is input means that is operated by the player. In the present embodiment, the controller 5 includes a first controller 7 and a second controller 8 each of which can be held by the player with one hand of the player, and a gyro sensor unit 9 that is attached, in a detachable manner, to the first controller 7. The first controller 7 is an input apparatus that is operated by the player. The first controller 7 generates operation data indicating a content of an operation performed with respect to the first controller 7. The gyro sensor unit 9 functions as state detection means that detects the position and the orientation of the first controller 7, with the gyro sensor unit 9 being attached to the first controller 7. The gyro sensor unit 9 detects the angular velocity of the first controller 7, and outputs angular velocity data indicating the detected angular velocity, to the first controller 7. Here, the angular velocity data is a state signal for specifying the position and the orientation of the first controller 7, which indicates the state of the first controller 7. The second controller 8 generates operation data indicating an operation performed with respect to itself. The operation data is outputted to the first controller 7 via the gyro sensor unit 9. The first controller 7 transmits, to the game apparatus 3, controller data including the operation data of the first controller 7, the operation data of second controller 8, the angular velocity data of the gyro sensor unit 9, and the like.

The first controller 7 and the game apparatus 3 are connected via wireless communication, for transmission of the controller data. In this embodiment, for example, the Bluetooth (registered trademark) technology is used for wireless communication between the first controller 7 and the game apparatus 3. Note that, in another embodiment, the first controller 7 and the game apparatus 3 may be connected via wired communication.

[External Configuration of First Controller 7]

FIG. 2 is a perspective view of the first controller 7 and the gyro sensor unit 9 as seen from a top rear side thereof. FIG. 3 is a perspective view of the first controller 7 as seen from a bottom front side thereof.

As shown in FIG. 2 and FIG. 3, the first controller 7 includes a housing 71 which is formed by, for example, plastic molding. The housing 71 has a generally parallelepiped shape extending in a longitudinal direction (Z-axis direction in FIG. 2 and FIG. 3) from front to rear. The overall size of the housing 71 is small enough to be held by one hand of an adult or even a child. An operation section 72 is placed on the housing 71.

An operation section 72 provided on the upper surface of the housing 71 includes a cross key 72a, operation buttons 72b to 72g, and an operation button 72h.

The cross key 72a is a cross-shaped four-direction push switch. The cross key 72a includes operation portions corresponding to four directions (front, rear, right and left), which are respectively located on cross-shaped projecting portions so as to be arranged at intervals of 90 degrees. A player selects one of the front, rear, right and left directions by pressing one of the operation portions of the cross key 72a. Through an operation of the cross key 72a, the player can, for example, select an option from a plurality of options.

Each of the operation buttons 72b to 72g outputs a corresponding operation signal when the player presses a head the operation button. For example, functions as a number one button, a number two button and an A button are assigned to the operation buttons 72b to 72d, respectively. Also, functions as a minus button, a home button and a plus button are assigned to the operation buttons 72e to 72g, respectively. Operation functions are assigned to the operation buttons 72b to 72g in accordance with the game program executed by the game apparatus 3. It is noted that the operation button 72f has a top surface thereof buried in the top surface of the housing 71, so as not to be inadvertently pressed by the player.

The operation button 72h is a power switch for turning on and off the power to the game apparatus 3 by remote control. The operation button 72h has a top surface thereof buried in the top surface of the housing 71, and is an operation button of the same type as the operation button 72f.

Besides the operation section 72, a plurality of LEDs 702 are provided on the upper surface of the housing 71. Here, controller types (numbers) are assigned to the first controllers 7 such that the first controllers 7 are distinguishable from each other. The LEDs 702 are used for, for example, informing the player of the controller type which is currently set for the first controller 7. More specifically, when the first controller 7 transmits controller data to the wireless controller module 19 (see FIG. 5), one of the plurality of LEDs 702 which corresponds to the controller type of the first controller 7 is lit up.

Figure 6:
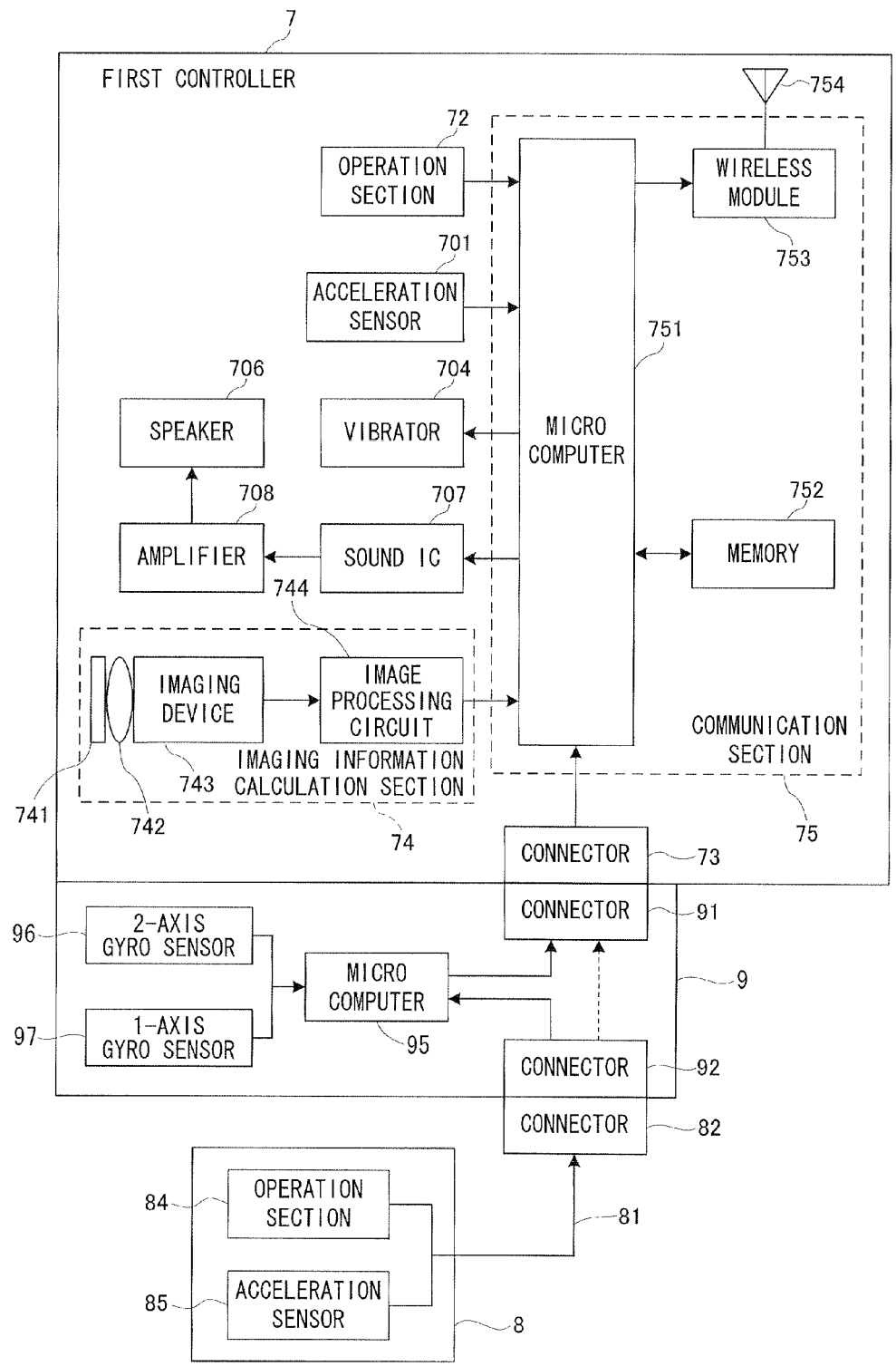
FIG. 6 is a block diagram showing an internal configuration of a controller 5.

On the top surface of the housing 71, a plurality of holes 711 are provided between the operation button 72b and the operation buttons 72e to 72g for emitting sound from a speaker 706 included in the housing 71 (see FIG. 6).

As shown in FIG. 3, a recessed portion is formed on a bottom surface of the housing 71. The recessed portion is formed in a position in which an index finger or middle finger of the player is located when the player holds the first controller 7 such that the front surface thereof faces the makers 6L and 6R. On the rear side of a slope surface of the recessed portion, an operation button 72i is provided. The operation button 72i outputs an operation signal assigned to the operation button 72i by the player pressing the head of the operation button 72i, and functions as, for example, a B button.

On a front surface of the housing 71, an imaging device 743 (see FIG. 6) constituting a part of an imaging information calculation section 74 (see FIG. 3) is provided. The imaging information calculation section 74 is a system for analyzing image data of an image taken by the first controller 7, thereby identifying an area having a high brightness in the image and detecting a position of a center of gravity, a size and the like of the area. The imaging information calculation section 74 has, for example, a maximum sampling period of about 200 frames/sec, and therefore can trace and analyze even a relatively fast motion of the first controller 7. A configuration of the imaging information calculation section 74 will be described later in detail. On a rear surface of the housing 71, a connector 73 (see FIG. 2) is provided. The connector 73 is, for example, an edge connector.

[External Configuration of Gyro Sensor Unit 9]

Though not shown in FIG. 2, a connector 91 (see FIG. 6) that can be connected to the connector 73 of the first controller 7 is provided to the front surface of the gyro sensor unit 9. When the connector 91 is connected to the connector 73, the gyro sensor unit 9 is physically and electrically connected to the first controller 7. The gyro sensor unit 9 detects angle velocities around three axes (X-axis, Y-axis, and Z-axis) of the first controller 7 while the gyro sensor unit 9 and the first controller 7 being unified. After the angular velocities of the first controller 7 have been detected, angular velocity data indicating the detection result is outputted from the gyro sensor unit 9 to the first controller 7.

A connector 92 (see FIG. 6) that can be connected to the connector 82 (see FIG. 1) of the second controller 8 is provided to the rear surface of the gyro sensor unit 9. When the connector 82 is connected to the connector 92, the second controller 8 is connected to the first controller 7 via the gyro sensor unit 9. It is noted that FIG. 2 shows a state where a connector cover 93 is attached to the connector 92, and therefore, the connector 92 is not shown.

Release buttons 94 are provided at the side surfaces of the gyro sensor unit 9. The gyro sensor unit 9 includes hooks projecting from the front surface of the gyro sensor unit 9, which are not shown. When the gyro sensor unit 9 is to be attached to the first controller 7, the hooks are inserted into the housing 71 via holes 76 (see FIG. 2) formed on the rear surface of the housing 71, and then the hooks are engaged with the inner wall of the housing 71. Thus, the gyro sensor unit 9 is fixed to the first controller 7. The release buttons 94 are interlinked with the hooks. The player can detach the gyro sensor unit 9 from the first controller 7 by pulling out the hooks from the housing 71 while pressing the release button 94.

[External configuration of Second Controller 8]

The connector 82 (see FIG. 1) of the second controller 8 can be connected to the connector 73 (see FIG. 2 and FIG. 6) of the first controller 7, or the connector 92 (see FIG. 6) of the gyro sensor unit 9. When the connector 82 is connected to the connector 73, operation data from the second controller 8 is directly inputted to the first controller 7 via a cable 81 and the connector 82. On the other hand, when the connector 91 is connected to the connector 73, and the connector 82 is connected to the connector 92, operation data from the second controller 8 is inputted to the first controller 7 via the cable 81, the connector 82, and the gyro sensor unit 9.

Figure 4A:
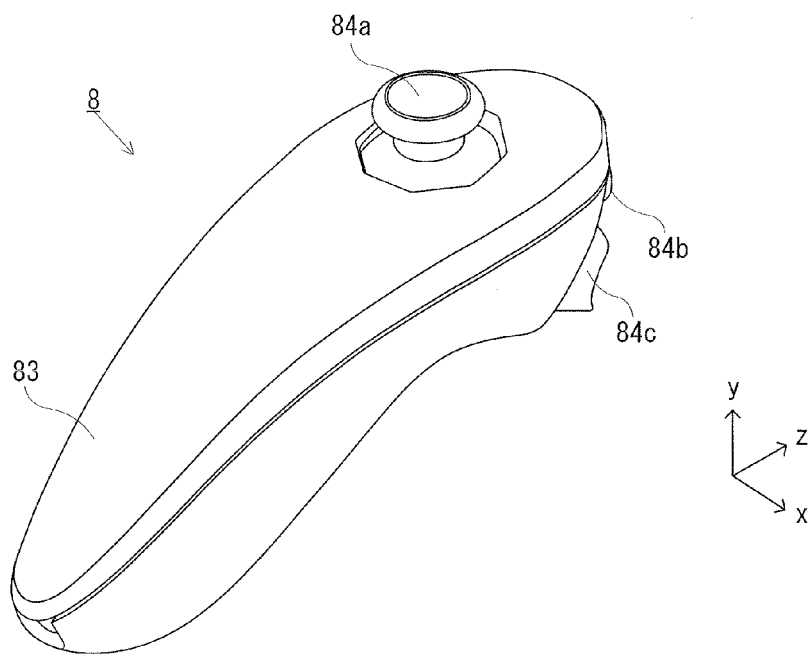
FIGS. 4A and 4B are perspective views of a second controller 8.
Figure 4B:
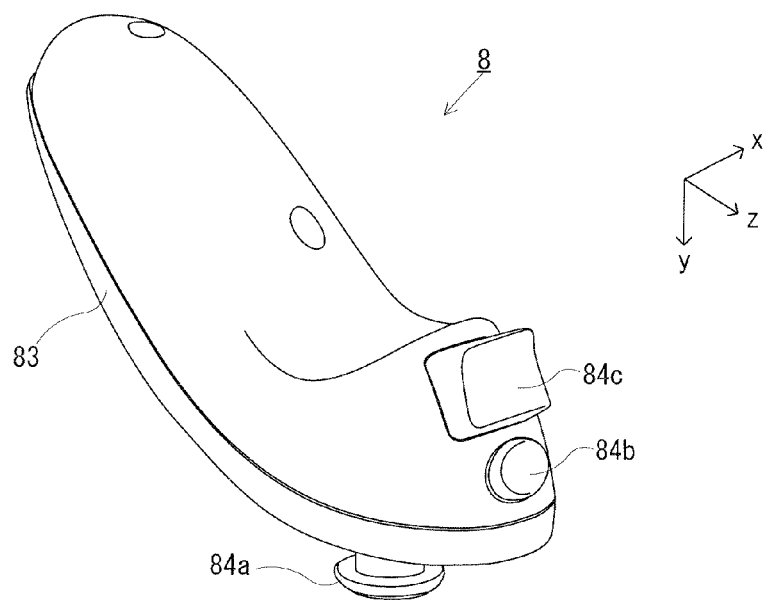

FIG. 4 is a perspective view of the second controller 8. FIG. 4(A) is a perspective view of the second controller 8 as seen from a top rear side thereof, and FIG. 4(B) is a perspective view of the second controller 8 as seen from a bottom front side thereof. It is noted that in FIG. 4, the cable 81 and the connector 82 of the second controller 8 are not shown.

The second controller 8 has a housing 83 formed by, for example, plastic molding. The housing 83 has an elliptic shape elongating in the direction (Z-axis direction in FIG. 4) from front to rear. The width, on the rear side, in the horizontal direction (X-axis direction), of the housing 83 is narrower than the width on the front side in the horizontal direction. In addition, as the side surface of the housing 83 is seen, the housing 83 has a curved shape as a whole such that the shape curves down from the front portion of the housing 83 which extends in the horizontal direction, to the rear portion. The overall size of the housing 83 is small enough to be held by one hand of an adult or even a child as in the housing 71 of the first controller 7. The length in the longitudinal direction (Z-axis direction) of the housing 83 is set to be slightly smaller than that of the housing 71. An operation section 84 is provided to the housing 83.

An analog joystick 84a is provided, as the operation section 84, on the front side of the top surface of the housing 83. In addition, a C-button 84b and a Z-button 84c are provided on the front surface of the housing 83. Operation functions are assigned to the analog joystick 84a, the C-button 84b, and the Z-button 84c in accordance with the game program executed by the game apparatus 3. The player can perform a game operation by inclining the analog joystick 84a or pressing the buttons 84b and 84c.

[Internal Configuration of Game Apparatus 3]

Next, an internal configuration of the game apparatus 3 will be described with reference to FIG. 5. FIG. 5 is a block diagram showing the configuration of the game apparatus 3. The game apparatus 3 has a CPU 10, a system LSI 11, an external main memory 12, a ROM/RTC 13, a disc drive 14, an AV-IC 15, and the like.

The CPU 10 executes a game program stored on the optical disc 4 to perform the game process, i.e., functions as a game processor. The CPU 10 is connected to the system LSI 11. In addition to the CPU 10, the external main memory 12, the ROM/RTC 13, the disc drive 14, and the AV-IC 15 are connected to the system LSI 11. The system LSI 11 performs processes, such as controlling data transfer between each component connected thereto, generating an image to be displayed, obtaining data from an external apparatus, and the like. An internal configuration of the system LSI 11 will be described below.

The external main memory 12 is a volatile memory. The external main memory 12 stores a program, such as a game program read out from the optical disc 4, a game program read out from a flash memory 17, or the like, or various kinds of data, and is used as a work area, a buffer area or the like for the CPU 10.

The ROM/RTC 13 has a ROM (so-called boot ROM) which stores a program for booting the game apparatus 3, and a clock circuit (RTC: Real Time Clock) which counts time.

The disc drive 14 reads out program data, texture data or the like from the optical disc 4, and writes the read data into an internal main memory 11e (described below) or the external main memory 12.

The system LSI 11 also includes an input/output processor (I/O processor) 11a, a GPU (Graphics Processor Unit) 11b, a DSP (Digital Signal Processor) 11c, a VRAM 11d, and the internal main memory 11e. The components 11a to 11e are connected to each other via an internal bus (not shown).

The GPU 11b, which is a part of a drawing means, generates an image in accordance with a graphics command (image drawing command) from the CPU 10. The VRAM 11d stores data (e.g., polygon data, texture data, etc.) which is required by the GPU 11b to execute the graphics command. When an image is generated, the GPU 11b generates image data using data stored in the VRAM 11d.

The DSP 11c, which functions as an audio processor, generates audio data using sound data, sound waveform (tone color) data or the like stored in the internal main memory 11e, the external main memory 12 or the like.

The image data and audio data thus generated are read out by the AV-IC 15. The AV-IC 15 outputs the read image data via an AV connector 16 to the liquid crystal television 2, and the read audio data to a loudspeaker 2a built in the liquid crystal television 2. Thereby, an image is displayed on the liquid crystal television 2 while a sound is outputted from the loudspeaker 2a.

The input/output processor 11a executes data transmission and reception between components connected thereto, or downloads data from an external apparatus. The input/output processor 11a is connected to the flash memory 17, a wireless communication module 18, a wireless controller module 19, an extension connector 20, and a memory card connector 21. An antenna 22 is connected to the wireless communication module 18, and an antenna 23 is connected to the wireless controller module 19.

The input/output processor 11a is connected via the wireless communication module 18 and the antenna 22 to a network, and can communicate with other game apparatuses or various servers connected to the network. The input/output processor 11a regularly accesses the flash memory 17 to detect the presence or absence of data that needs to be transmitted to the network. In the case of the presence of the data, the input/output processor 11a transmits the data via the wireless communication module 18 and the antenna 22 to the network. The input/output processor 11a also receives data transmitted from another game apparatus or data downloaded from a download server via the network, the antenna 22, and the wireless communication module 18, and stores the received data into the flash memory 17. The CPU 10 executes a game program to read out the data stored in the flash memory 17 and utilizes the data in the game program. In addition to data communicated between the game apparatus 3 and other game apparatuses or various servers, save data (result data or intermediate data of a game) of a game played using the game apparatus 3 may be stored into the flash memory 17.

The input/output processor 11a also receives controller data transmitted from the controller 7 via the antenna 23 and the wireless controller module 19, and stores (temporarily stores) the controller data into a buffer area of the internal main memory 11e or the external main memory 12.

Also, the extension connector 20 and the memory card connector 21 are connected to the input/output processor 11a. The extension connector 20 is a connector for interface, such as USB or SCSI. When a medium (e.g., an external storage medium, etc.), a peripheral device (e.g., another controller, etc.), or a wired communication connector is connected to the extension connector 20, communication with a network can be performed without using the wireless communication module 18. The memory card connector 21 is a connector for connecting an external storage medium, such as a memory card or the like. For example, the input/output processor 11a can access an external storage medium via the extension connector 20 or the memory card connector 21 to save data or read out data.

The game apparatus 3 is provided with a power button 24, a reset button 25, and an eject button 26. The power button 24 and the reset button 25 are connected to the system LSI 11. When the power button 24 is pressed down, power is supplied via an AC adaptor (not shown) to each component of the game apparatus 3. When the reset button 25 is pressed down, the system LSI 11 reboots the boot program of the game apparatus 3. The eject button 26 is connected to the disc drive 14. When the eject button 26 is pressed down, the optical disc 4 is ejected from the disc drive 14.

[Internal Configuration of Controller 5]

Next, an internal structure of the controller 5 will be described with reference to FIG. 6. FIG. 6 is a block diagram showing the internal configuration of the controller 5. It is noted that FIG. 6 shows a state in which the gyro sensor unit 9 is connected to the first controller 7, and the second controller 8 is connected to the gyro sensor unit 9.

As shown in FIG. 6, the first controller 7 has, in addition to the above-described operation portion 72, the image capture information computing section 74, an acceleration sensor 701, a vibrator 704, a loudspeaker 706, a sound IC 707, an amplifier 708, and a communication section 75.

The image capture information computing section 74 includes an infrared filter 741, a lens 742, the image capturing element 743, and an image processing circuit 744. The infrared filter 741 allows, among lights incident on the front surface of the first controller 7, only an infrared light to pass therethrough. The lens 742 converges the infrared light which has passed through the infrared filter 741, and causes the infrared light to enter the image capturing element 743. The image capturing element 743 is a solid-state image capturing element such as a CMOS sensor or a CCD sensor. The image capturing element 743 receives the infrared light converged by the lens 742, and outputs an image signal. Here, an infrared light is emitted toward the front of the liquid crystal television 2 from the markers 6R and 6L of the marker section 6 fixed to the liquid crystal television 2. Therefore, by the infrared filter 741 being provided, the image capturing element 743 receives only an infrared light that has passed through the infrared filter 741, to generate image data. Thus, the image capturing element 743 can shoot a precise image of the markers 6R and 6L. Hereinafter, an image shot by the image capturing element 743 is referred to as a shot image. The image data generated by the image capturing element 743 is processed by the image processing circuit 744. The image processing circuit 744 calculates the positions of the shot objects (markers 6R and 6L) in the shot image. The image processing circuit 744 outputs coordinates indicating the calculated positions to the microcomputer 751 of the communication section 75. The coordinate data is transmitted, as operation data, to the game apparatus 3 by the microcomputer 751. Hereinafter, the above coordinates are referred to as "marker coordinates". Since the marker coordinates vary in accordance with the direction (inclination angle) and the position of the first controller 7, the game apparatus 3 can calculate the direction and the position of the first controller 7 by using the marker coordinates.

The acceleration sensor 701 detects the direction and the position of the first controller 7. The acceleration sensor 701 detects linear accelerations in three directions, i.e., an up-down direction (the Y-axis shown in FIG. 2), a left-right direction (the X-axis direction shown in FIG. 2), and a front-rear direction (the Z-axis direction shown in FIG. 2). A state signal (acceleration data) indicating the accelerations detected by the acceleration sensor 701 is outputted to the communication section 75, and then the communication section 75 transmits the state signal to the game apparatus 3. Since the accelerations detected by the acceleration sensor 701 vary in accordance with the direction (inclination angle) and the motion of the first controller 7, the game apparatus 3 can calculate the position and the orientation of the first controller 7, based on the acceleration data. In the present embodiment, the game apparatus 3 calculates the position and the orientation of the first controller 7, based on angular velocity data described later. However, the game apparatus 3 can also calculate the position and the orientation of the first controller 7, based on the acceleration data.

The communication section 75 includes a microcomputer 751, a memory 752, a wireless module 753, and the antenna 754. The microcomputer 751 controls the wireless module 753 for wirelessly transmitting transmission data while using the memory 752 as a storage area during a process. Also, the microcomputer 751 controls operations of the sound IC 707 and the vibrator 704, depending on data from the game apparatus 3 which is received by the wireless module 753 via the antenna 754. Since the controller 7 includes the wireless module 753 and the antenna 754, the first controller 7 functions as a wireless controller.

The sound IC 707 processes sound data or the like transmitted from the game apparatus 3 via the communication section 75. The sound data is amplified by the amplifier 708 and transmitted to the loudspeaker 706, so that a sound is outputted from the loudspeaker 706. The vibrator 704 is, for example, a vibration motor or a solenoid. The vibrator 704 is actuated in accordance with vibration data (e.g. a signal for turning ON or OFF the vibrator 704), or the like, transmitted from the game apparatus 3 via the communication section 75. The activation of the vibrator 704 generates vibration in the controller 7, so that the vibration is transferred to a player's hand holding the first controller 7, thereby making it possible to achieve a so-called vibration-feature supporting game.

The second controller 8 includes the operation section 84 and an acceleration sensor 85, as shown in FIG. 6. For example, a 3-axis acceleration sensor is applied to the acceleration sensor 85. The acceleration sensor 85 detects linear accelerations in three-axis directions, i.e., an up-down direction (the Y-axis shown in FIG. 4), a left-right direction (the X-axis direction shown in FIG. 4) and a front-rear direction (the Z-axis direction shown in FIG. 4). Acceleration data indicating the accelerations detected by the acceleration sensor 85 is sent to the first controller 7, and then the communication section 75 transmits the acceleration data to the game apparatus 3. Since the accelerations detected by the acceleration sensor 85 vary in accordance with the direction (inclination angle) and the motion of the second controller 8, the game apparatus 3 can calculate the position and the orientation of the second controller 8, based on the acceleration data from the acceleration sensor 85, as in the first controller 7.

The operation section 84 includes the analog joystick 84a, the C-button 84b, and the Z-button 84c described above. When the operation section 84 is operated, operation data indicating the content of the operation is generated. The operation data is sent to the gyro sensor unit 9 via the cable 81, the connector 82, and the connector 92. In addition, the acceleration data indicating the accelerations of the second controller 8 detected by the acceleration sensor 85 is also sent to the gyro sensor unit 9 in the same manner. The operation data and the acceleration data are sent to the communication section 75 of the first controller 7 by the gyro sensor unit 9.

The gyro sensor unit 9 detects angular velocities around three axes (X-axis, Y-axis, and Z-axis, in the present embodiment), and outputs angular velocity data indicating the detected angular velocities to the first controller 7. The gyro sensor unit 9 includes, in its inside, a microcomputer 95, a 2-axis gyro sensor (angular velocity sensor) 96, and a 1-axis gyro sensor (angular velocity sensor) 97, as shown in FIG. 6.

Figure 7:
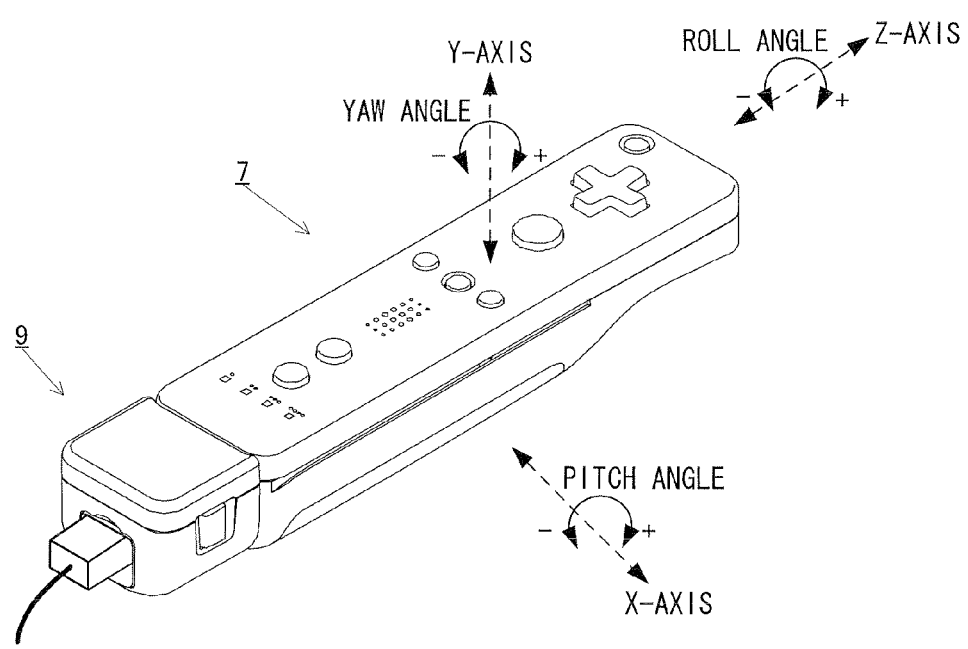
FIG. 7 is a perspective view of the first controller 7 and the gyro sensor unit 9, for explaining a roll angle, a pitch angle, and a yaw angle around which accelerations are detected by the gyro sensor unit 9.

FIG. 7 is a perspective view of the first controller 7 and the gyro sensor unit 9, for explaining a roll angle, a pitch angle, and a yaw angle around which accelerations are detected by the gyro sensor unit 9. The 2-axis gyro sensor 96 detects two angular velocities (per unit of time) with respect to the roll angle and the pitch angle, that is, detects an angular velocity around the Z-axis and an angular velocity around the X-axis. The 1-axis gyro sensor 97 detects an angular velocities (per unit of time) with respect to the yaw angle, that is, detects an angular velocity around the Y-axis. It is noted that in the present specification, as shown in FIG. 7, rotation directions around the Z-axis, X-axis, and Y-axis are referred to as a roll direction, a pitch direction, and a yaw direction, respectively, with the positive direction of the Z-axis, which is the shooting direction of the first controller 7, being set as a reference.

Data indicating the angular velocities detected by the 2-axis gyro sensor 96 and the 1-axis gyro sensor 97 are outputted to the microcomputer 95. Therefore, data indicating the angular velocities around the three axes of the X, Y, and Z axes are inputted to the microcomputer 95. The microcomputer 95 outputs the data representing the angular velocities around the three axes, as angular velocity data, to the first controller 7 via the connector 91. The data transmission from the microcomputer 95 to the first controller 7 is sequentially performed at a predetermined cycle, and the game is typically processed at a cycle of 1/60 seconds (corresponding to one frame time), and the transmission is preferably performed at a cycle shorter than a cycle of 1/60 seconds. Though being described later, the angular velocity data is transmitted from the first controller 7 to the game apparatus 3. Since the angular velocities of the first controller 7 detected by the gyro sensor unit 9 vary in accordance with the direction (inclination angle) and the motion of the first controller 7, the game apparatus 3 can accurately calculate the position and the orientation of the first controller 7, based on the angular velocity data.

The first controller 7 will be described again. The memory 752 temporarily stores the operation data from the operation section 72, the marker coordinates from the imaging information calculation section 74, and the acceleration data of the acceleration sensor 701. In addition, since the gyro sensor unit 9 is attached to the first controller 7, the memory 752 temporarily stores the angular velocity data (state signal of the first controller 7) sent from the t-axis gyro sensor 96 and the 1-axis gyro sensor 97. In addition, since the second controller 8 is connected to the first controller 7 via the gyro sensor unit 9, the memory 752 temporarily stores the operation data from the operation section 84, and the acceleration data from the acceleration sensor 85. When timing of transmission to the wireless controller module 19 (see FIG. 5) of the game apparatus 3 arrives, the microcomputer 751 outputs data stored in the memory 752, as the above control data, to the wireless module 753. Thereafter, the wireless module 753 modulates a carrier wave of a predetermined frequency with the controller data by using, for example, the Bluetooth technique, and emits the resultant low power radio wave signal from the antenna 45. That is, the controller data is modulated onto the low power radio wave signal by the wireless module 753 and transmitted from the first controller 7. The wireless controller module 19 of the game apparatus 3 receives the low power radio wave signal. The game apparatus 3 demodulates or decodes the received low power radio wave signal, and thereby can obtain the operation data. Based on the obtained controller data and the game program, the CPU 10 of the game apparatus 3 performs the game processing.

It is noted that the wireless transmission from the communication section 75 to the wireless controller module 19 is sequentially performed at a predetermined time interval. Since game process is generally performed at a cycle of 1/60 sec. (corresponding to one frame time), data is preferably transmitted at a cycle of a shorter time period. The communication section 75 of the first controller 7 transmits the controller data at intervals of, for example, 1/200 seconds, to the wireless controller module 19 of the game apparatus 3.

Figure 8:
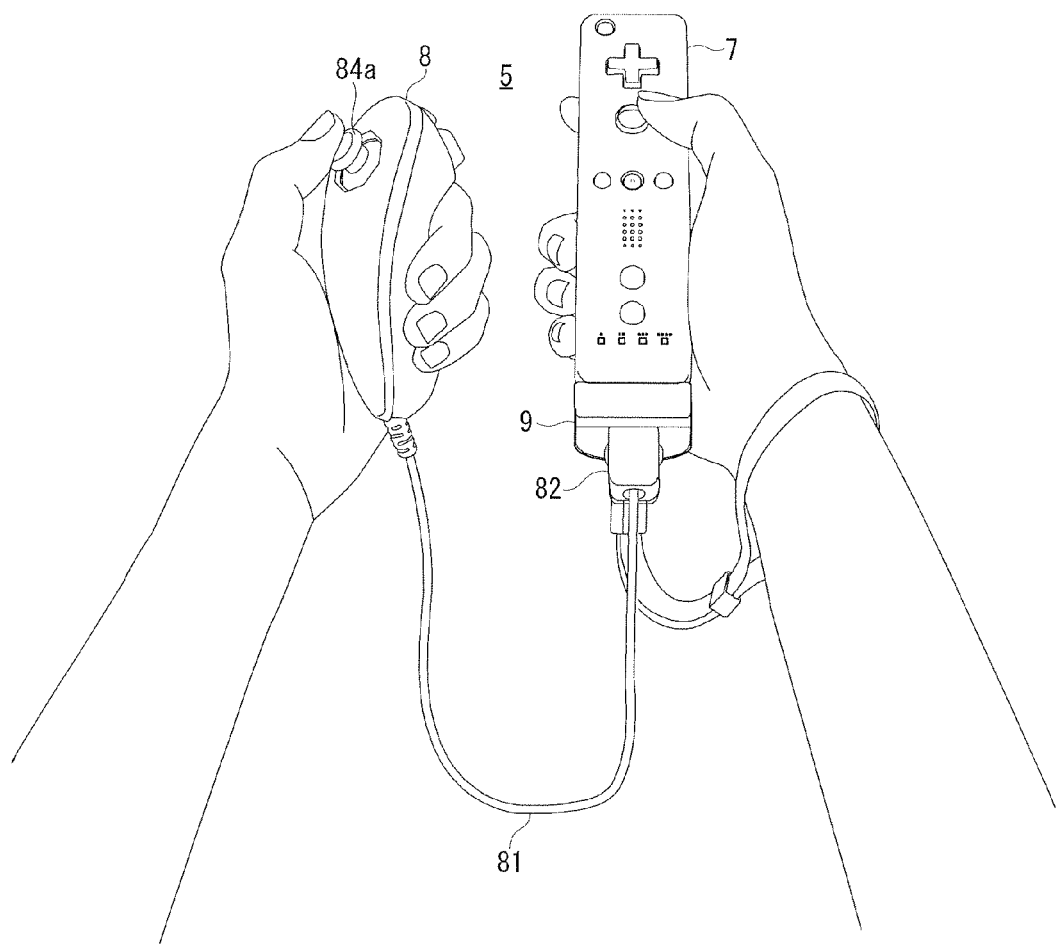
FIG. 8 is an explanation view exemplifying a state in which the player holds the first controller 7 and the second controller 8.

The above-described controller 5 allows the player to perform an input to an application such as a game not only by conventional button operation of pressing each operation button, but also by moving the controller 5 itself. When the player plays a game, the player holds the first controller 7 with the right hand, and holds the second controller 8 with the left hand, as shown in FIG. 8. As described above, the first controller 7 includes the acceleration sensor 701, and the gyro sensor unit 9 is fixed to the first controller 7. In addition, the second controller 8 includes the acceleration sensor 85. When the first controller 7 is moved by the player, the acceleration sensor 701 detects accelerations in three-axis directions of the first controller 7, the 2-axis gyro sensor 96 and the 1-axis gyro sensor 97 of the gyro sensor unit 9 detect angular velocities around three axes of the first controller 7. On the other hand, when the second controller 8 is moved by the player, the acceleration sensor 85 detects accelerations in three-axis directions of the second controller 8. Data indicating these detection results is transmitted, as controller data, to the game apparatus 3 as described above, whereby the data is reflected in game processing. Thus, the player can perform a game operation such as swinging the first controller 7 and the second controller 8.

It is noted that the configuration of the hardware described above is merely an example. The configurations of the game apparatus 3 and the controller 5 can be changed as appropriate.

[Outline of Game]

Next, with reference to FIG. 9 to FIG. 11, an outline of a game that is progressed by the CPU 10 of the game apparatus 3 executing a game program will be described.

A game executed in the present embodiment is an action adventure game in which the player operates a player object 101 and a sword object 104 placed in a virtual game space (virtual 3-dimensional space) to defeat an enemy. FIG. 9 is a screen view showing an example of a game image displayed on the liquid crystal television 2. As shown in FIG. 9, a scene in which the player object 101 which is operated by the player has encountered enemy objects 102 is displayed on the liquid crystal television 2. The player can move the player object 101 by operating the analog joystick 84a (see FIG. 8) of the second controller 8.

Figure 9:
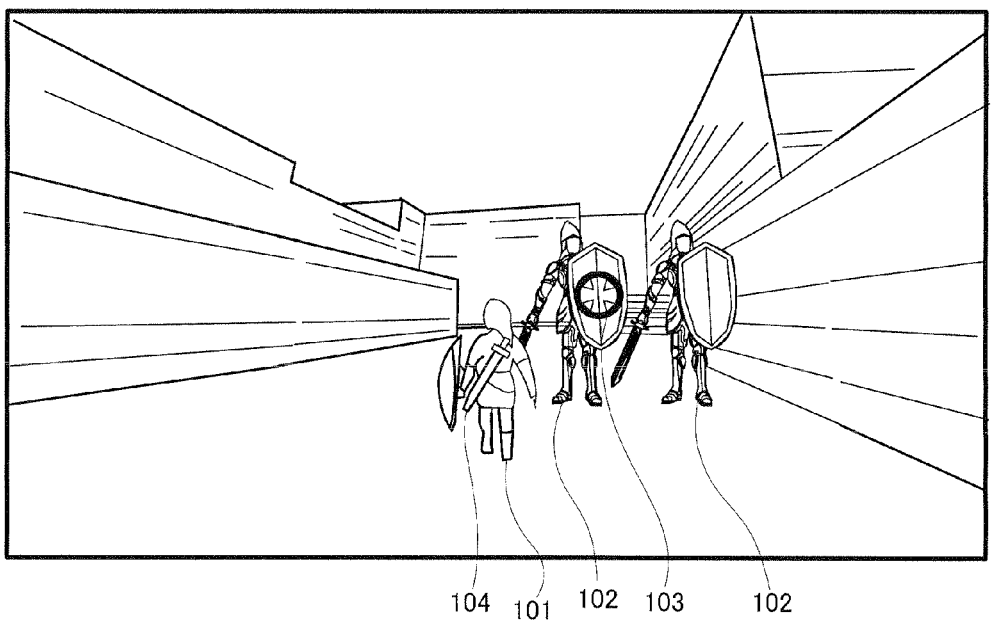
FIG. 9 is a screen view showing an example of a game image displayed on a liquid crystal television 2.

For example, when the player object 101 has moved to a position where the player object 101 can attack the enemy object 102, a scene in which the player object 101 draws the sword object 104 (one example of first objects) on the back of the player object 101 from a scabbard and gets ready with the sword object 104 is displayed on the liquid crystal television 2, though not shown in FIG. 9. At this time, if there are a plurality of enemy objects 102 that the player object 101 can attack, a cursor 103 is displayed such that the cursor 103 overlaps with one of the plurality of enemy objects 102. The cursor 103 is used for switching an enemy object to be attacked by the player object 101. For example, when the Z-button 84c of the second controller 8 is pressed, the cursor 103 is displayed such that the cursor 103 overlaps with another enemy object 102 different from the enemy object 102 with which the cursor 103 overlapped before the button operation. Thus, if there are a plurality of enemy objects 102 that the player object 101 can attack, the player can switch the enemy object 102 to be attacked, by pressing the Z-button 84c. It is noted that even if one of enemy objects is selected as described above, in the case where the sword object 104 collides with a plurality of the enemy objects when the sword object 104 has been swung, it is possible to attack all of the plurality of enemy objects.

The player gets ready with the first controller 7 while using the first controller 7 as a sword, and thereby can cause the player object 101 to get ready with the sword object 104. In addition, the player performs an operation (game operation) of swinging the first controller 7 in any swing direction (operation direction) from the state in which the player is ready with the first controller 7, and thereby can cause the player object 101 to perform an attack action of striking the enemy object 102 with the sword object 104. It is noted that since the position and the orientation of the first controller 7 are detected by the gyro sensor unit 9, the player can cause the player object 101 to swing the sword object 104 in the same direction as the player swings the first controller 7.

FIG. 10 is a screen diagram showing an example of an animation displayed on the liquid crystal television 2 when the player has swung the first controller 7 from left to right. FIG. 11 is a screen diagram showing an example of an animation displayed on the liquid crystal television 2 when the player has swung the first controller 7 from right to left. If the player has swung the first controller 7 from left to right, as shown in FIG. 10, an animation (a moving image indicating a motion blur effect) indicating a scene in which the sword object 104 hits at the enemy object 102 and damages the enemy object 102 is displayed. On the other hand, if the player has swung the first controller 7 from right to left, as shown in FIG. 11, an animation indicating a scene in which the sword object 104 is repelled without hitting at the enemy object 102 is displayed. Thus, a feature of example embodiments of the present invention is that a representation indicating a response of an enemy object (enemy object 102, in the present embodiment) made when the sword object 104 has collided with the enemy object can be easily switched in accordance with the swing direction of the first controller 7 (the swing direction of the sword object 104). Hereinafter, a configuration of the game apparatus 3 and game processing executed by the game apparatus 3 that are for switching a representation indicating a response of the enemy object 102 in accordance with the swing direction of the first controller 7 will be described in detail.

[Main Data]

Figure 12:
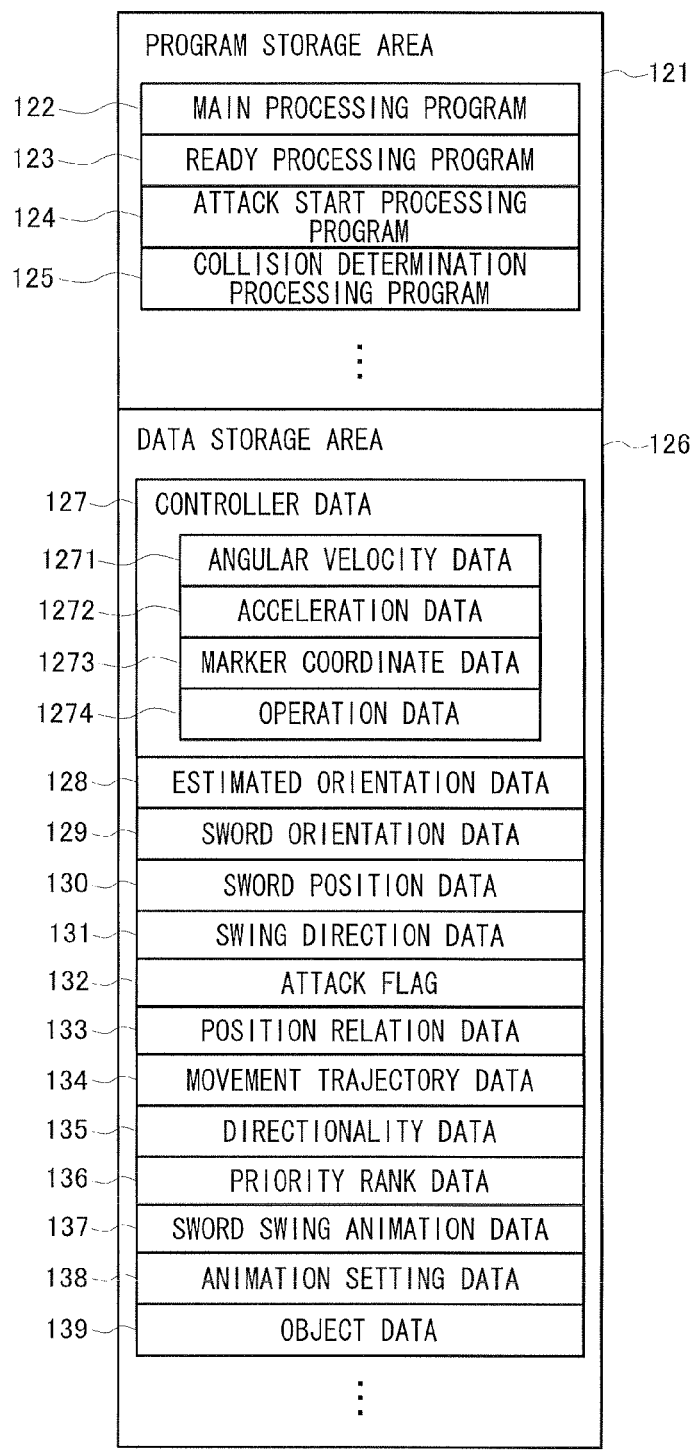
FIG. 12 is a diagram exemplifying a memory map of an external main memory 12.

Hereinafter, with reference to FIG. 12, data to be stored in the external main memory 12 upon the game processing will be described. Here, FIG. 12 is a diagram showing an example of a memory map of the external main memory 12. As shown in FIG. 12, the external main memory 12 includes a program storage area 121 and a data storage area 126. The program storage area 121 stores a game program that is executed by the CPU 10. The data storage area 126 stores various data needed for the game processing. Data stored in advance in the optical disc 4 is loaded as the program in the program storage area 121 and a part of data in the data storage area 126, upon the game processing.

The program storage area 121 stores a main processing program 122, a ready processing program 123, an attack start processing program 124, a collision determination processing program 125, and the like. The main processing program 122 is a program for causing the CPU 10 to execute main processing shown in FIG. 13 described later. The ready processing program 123 is a program for causing the CPU 10 to execute ready processing shown in FIG. 15 described later. The attack start processing program 124 is a program for causing the CPU 10 to execute attack start processing shown in FIG. 16 described later. The collision determination processing program 125 is a program for causing the CPU 10 to execute collision determination processing shown in FIG. 17 and FIG. 18 described later.

The data storage area 126 stores controller data 127, estimated orientation data 128, sword orientation data 129, sword position data 130, swing direction data 131, attack flag 132, position relation data 133, movement trajectory data 134, directionality data 135, priority rank data 136, sword swing animation data 137, animation setting data 138, object data 139, and the like.

The controller data 127 is controller data which has been transmitted from the first controller 7 to the game apparatus 3. As described above, the controller data is transmitted from the first controller 7 to the game apparatus 3 at a rate of once every ¹⁄₂₀₀ second. Therefore, the controller data 127 stored in the external main memory 12 is updated at this rate. In the present embodiment, in the data storage area 126, an old piece of controller data is rewritten to the latest piece of controller data, whereby the old piece of controller data is discarded. However, in the case where a correction of data, or the like is performed by using the old controller data, the past several pieces of controller data may be stored, for example.

The controller data 127 includes angular velocity data 1271, acceleration data 1272, marker coordinate data 1273, and operation data 1274. The angular velocity data 1271 is data indicating angular velocities of the first controller 7 around the three axes of the X-axis, the Y-axis, and the Z-axis shown in FIG. 7 detected by the gyro sensor unit 9 (see FIG. 6). The acceleration data 1272 includes data indicating accelerations of the first controller 7 in the three axes of the X-axis, the Y-axis, and the Z-axis shown in FIG. 2 detected by the acceleration sensor 701 (see FIG. 6), and data indicating accelerations of the second controller 8 in the three axes of the x-axis, the y-axis, and the z-axis shown in FIG. 4 detected by the acceleration sensor 85 (see FIG. 6).

The marker coordinate data 1273 is data indicating marker coordinates calculated by the image processing circuit 744 of the imaging information calculation section 74. The marker coordinates are represented in a two-dimensional coordinate system for representing a position on a plane corresponding to a shot image. It is noted that in the case where both the markers 6R and 6L are shot by the imaging device 743, two sets of marker coordinates are calculated. On the other hand, in the case where only one of the markers 6R and 6L is present in a range that can be shot by the imaging device 743, only one marker is shot by the imaging device 743, and one set of marker coordinates are calculated. In addition, in the case where none of the markers 6R and 6L is present in a range that can be shot by the imaging device 743, no marker is shot by the imaging device 743, and marker coordinates are not calculated. Thus, the marker coordinate data 1273 can indicate two sets of marker coordinates or one set of marker coordinates, or can indicate that marker coordinates do not exist.

The operation data 1274 includes data indicating input states of the operation buttons 72a to 72i of the first controller 7, and data indicating input states of the analog joystick 84a, the C-button 84b, and the Z-button 84c of the second controller 8. The CPU 10 of the game apparatus 3 performs processing for realizing a function indicated by the operation data 1274.

The estimated orientation data 128 is data indicating the orientation of the first controller 7. The estimated orientation data 128 is updated based on the angular velocity data 1271, every time the controller data from the first controller 7 is received by the wireless controller module 19 and then the angular velocity data 1271 is updated.

The sword orientation data 129 is data indicating the orientation of the sword object 104. The sword position data 130 is data indicating the position of the sword object 104 in the virtual game space. The sword orientation data 129 and the sword position data 130 are updated as appropriate based on the estimated orientation data 128 so that the sword orientation data 129 and the sword position data 130 will reflect the orientation and the position of the first controller 7, respectively.

The swing direction data 131 is data indicating the direction in which the player has swung the first controller 7 (the direction in which the first controller 7 has moved). The swing direction data 131 is calculated based on the angular velocity data 1271.

The attack flag 132 is data indicating whether or not an instruction of starting an attack action by the sword object 104 has been performed. As will be described later in detail, when the player performs a game operation of swinging the first controller 7, the CPU 10 determines whether or not an angular velocity (angular velocity indicated by the angular velocity data 1271) of the first controller 7 is equal to or more than a predetermined value. Then, if the CPU 10 has determined that an angular velocity of the first controller 7 is equal to or more than a predetermined value, since it is considered that an instruction of an attack action by the sword object 104 has been performed, the CPU 10 sets the attack flag 132 to ON. In addition, the attack flag 132 is set to OFF after a content of a sword swing animation indicating a scene in which the player object 101 swings the sword object 104 is set (i.e., after processing of step S126 in FIG. 17 described later is performed).

The position relation data 133 is data indicating a position relation between the player object 101 and a non-player object such as an enemy object when the attack flag 132 has been set to ON. The position relation data 133 includes not only information indicating a position relation between the coordinates of the center of gravity of the player object 101 and the coordinates of the center of gravity of an enemy object, but also information indicating the orientation of the enemy object 102 such as the stance of the enemy object and the direction in which the enemy object faces.

The movement trajectory data 134 is data indicating the trajectory of a movement of the sword object 104 during a sword swinging operation in which the player object 101 swings the sword object 104. The trajectory of movement indicated by the movement trajectory data 134 is calculated based on the sword orientation data 129, the sword position data 130, and the swing direction data 131.

The directionality data 135 is data that is set for some enemy objects (enemy object 102, in the present embodiment). The directionality data 135 indicates a hitting direction that is the direction in which the sword object 104 can hit at the enemy object 102.

When the player object 101 attacks the enemy object 102 with the sword object 104, if the swing direction of the first controller 7 indicated by the swing direction data 131 coincides with a hitting direction indicated by a piece of the directionality data 135 corresponding to the enemy object 102 to be attacked, hitting processing is performed for the enemy object 102. Here, the hitting processing is processing of causing the sword object 104 to hit at the enemy object 102, and damaging the enemy object 102 at which the sword object 104 has hit.

On the other hand, if the swing direction of the first controller 7 indicated by the swing direction data 131 does not coincide with the hitting direction, repelling processing is performed for the enemy object 102 to be attacked. Here, the repelling processing is processing of causing the enemy object 102 to repel the sword object 104. When the repelling processing is performed, the enemy object 102 is not damaged even if the sword object 104 has collided with the enemy object 102.

The priority rank data 136 is data that is set when a plurality of enemy objects to be attacked are present on the trajectory of a movement of the sword object 104 indicated by the movement trajectory data 134. The priority rank data 136 indicates priority ranks of the plurality of enemy objects present on the trajectory of a movement of the sword object

104. In the present embodiment, the priority ranks are set for the plurality of enemy objects such that the priority rank of an enemy object that will first collide with the sword object 104 when the sword object 104 is swung in the direction corresponding to the swing direction indicated by the swing direction data 131 is the highest. As will be described later, processing of determining whether to perform the hitting processing or the repelling processing is performed for an enemy object whose priority rank indicated by the priority rank data 136 is the highest is performed, and then an animation indicating a result of the processing is displayed on a screen of the liquid crystal television 2.

The sword swing animation data 137 is moving image data for displaying, on the screen, a scene in which the player object 101 swings the sword object 104 by using a motion blur effect. In the present embodiment, three types of animation data, that is, hitting processing animation data, repelling processing animation data, and missed swing processing animation data are stored, as the sword swing animation data 137, in the data storage area 126. Here, the hitting processing animation data is animation data for displaying, on the screen, a scene in which the sword object 104 hits at an enemy object. The repelling processing animation data is animation data for displaying, on the screen, a scene in which the sword object 104 is repelled by an enemy object (for example, the enemy object 102). The missed swing processing animation data is animation data for displaying, on the screen, a scene in which the player object 101 swings the sword object 104 and misses.

It is noted that a missed swing of the sword object 104 is an action of the player object 101 taking a full swing with a sword as in the case where the sword object 104 hits at an enemy object. Therefore, the hitting processing animation data may be used as the missed swing processing animation data. That is, animations indicating scenes in which the player object 101 swings a sword may be realized by two types of animation data including the hitting processing animation data and the repelling processing animation data. In addition, in the present embodiment, a case where the repelling processing animation data is used for displaying, on the screen, a scene in which the sword object 104 is repelled by the enemy object 102 will be described. However, the screen display for the repelling processing may be realized by continuously reproducing the hitting processing animation data and the repelling processing animation data.

The animation setting data 138 is data indicating a content of an animation to be displayed on the screen of the liquid crystal television 2 as a result of an attack action by the sword object 104. When an attack action by the sword object 104 has been performed, an animation corresponding to setting information indicated by the animation setting data 138 is reproduced. For example, if the animation setting data 138 indicating the "hitting processing" is stored in the data storage area 126, the hitting processing animation data of the sword swing animation data 137 is reproduced. In addition, for example, if the animation setting data 138 indicating the "repelling processing" is stored in the data storage area 126, the repelling processing animation data of the sword swing animation data 137 is reproduced.

The object data 139 is data that relates to objects such as the player object 101 and the enemy object 102 used in the game processing. The object data 139 includes position coordinate data, modeling data, texture data (RGB value), and the like for objects.

It is noted that the data storage area 126 also stores sound data used in the game processing, data that relates to control of a virtual camera for displaying, on the screen, the virtual game space, and the like, though not shown. These types of data do not directly relate to the present invention. Therefore, the description thereof is omitted herein.

[Main Process]

Next, the game processing to be executed by the game apparatus 3 will be described. When the game apparatus 3 is powered ON, the CPU 10 of the game apparatus 3 executes a boot program stored in the ROM/RTC 13. As a result, the units such as the external main memory 12 are initialized. Then, a game program stored in the optical disc 4 is loaded onto the external main memory 12, and the CPU 10 starts executing the game program.

Figure 13:
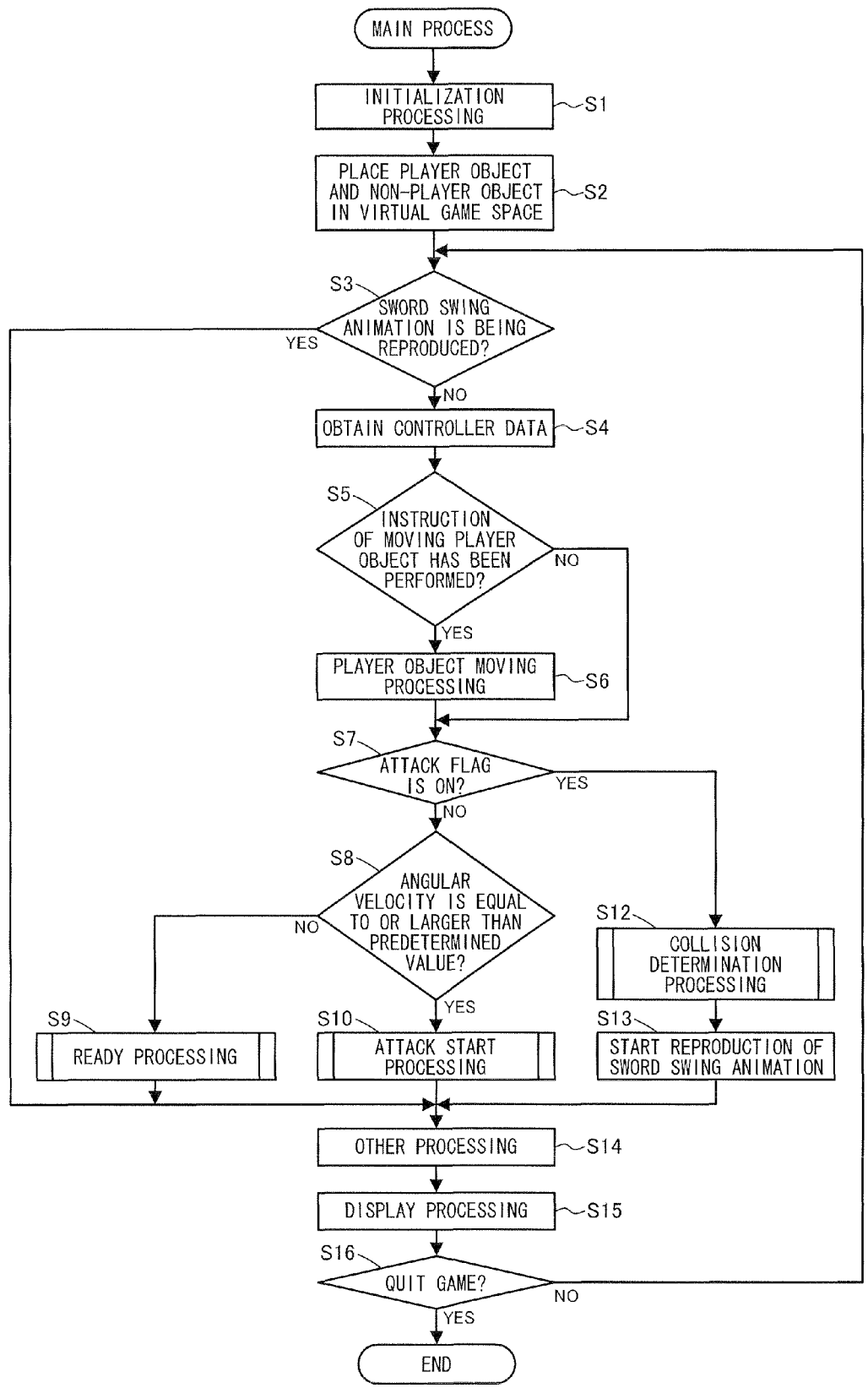
FIG. 13 is a flowchart showing an example of a main process to be executed by the game apparatus 3.

FIG. 13 is a flowchart showing an example of a main process to be executed by the game apparatus 3. First, the CPU 10 executes processing of initializing data to be used in subsequent processing (step S1). Specifically, the CPU 10 initializes various variables and flags in the data storage area 126 of the external main memory 12 to be used in subsequent processing. Then, the CPU 10 places, in a virtual game space, the player object 101, and a non-player object such as the enemy object 102 (step S2). Specifically, the CPU 10 stores, in the data storage area 126, data indicating an initial position of the virtual camera and initial places of objects at the beginning of the game.

Subsequently, a virtual game space is formed and a game image is displayed on the liquid crystal television 2. That is, the CPU 10 forms a 3-dimensional virtual game space, and places the objects in the virtual game space in accordance with the data indicating initial places of the objects. Then, the CPU 10 causes the GPU 11b to generate a game image indicating the virtual game space as seen from the virtual camera. The game image is outputted to the liquid crystal television 2, and thereby the game image is displayed on the liquid crystal television 2. Hereinafter, the game progresses while a processing loop from step S3 to step S16 is repeated every frame (every 1/60 second, in the present embodiment).

After processing of step S2, the CPU 10 determines, based on information stored in the data storage area 126, whether or not a sword swing animation in which the player object 101 swings the sword object 104 is being reproduced (step S3). If the CPU 10 has determined that a sword swing animation is being reproduced (YES in step S3), the process proceeds to step S14 described later.

If the CPU 10 has determined that a sword swing animation is not being reproduced (NO in step S3), the CPU 10 obtains controller data (step S4). Specifically, the CPU 10 stores, as the controller data 127, the controller data from the first controller 7 received by the wireless controller module 19, in the data storage area 126.

Next, the CPU 10 determines whether or not an instruction of moving the player object 101 has been performed (step S5). Specifically, the CPU 10 determines whether or not the operation data 1274 which is stored in the data storage area 126 as a part of the controller data 127 includes operation data indicating that the analog joystick 84a of the second controller 8 has been operated.

If the CPU 10 has determined that an instruction of moving the player object 101 has been performed (YES in step S5), that is, if the operation data 1274 includes operation data indicating that the analog joystick 84a has been operated, the CPU 10 moves the player object 101 to a position corresponding to the operation data (step S6). The object data 139 is updated so as to indicate the latest position of the player object 101 through the processing of step S6. On the other hand, if the CPU 10 has determined that an instruction of moving the player object 101 has not been performed (NO in step S5), that is, if the operation data 1274 does not include operation data indicating that the analog joystick 84*a* has been operated, the process proceeds to step S7 described later.

After the CPU 10 has performed processing of moving the player object 101 in step S6, or if the CPU 10 has determined "NO" in step S5, the CPU 10 determines whether or not the attack flag 132 is set at ON (step S7).

Figure 14:
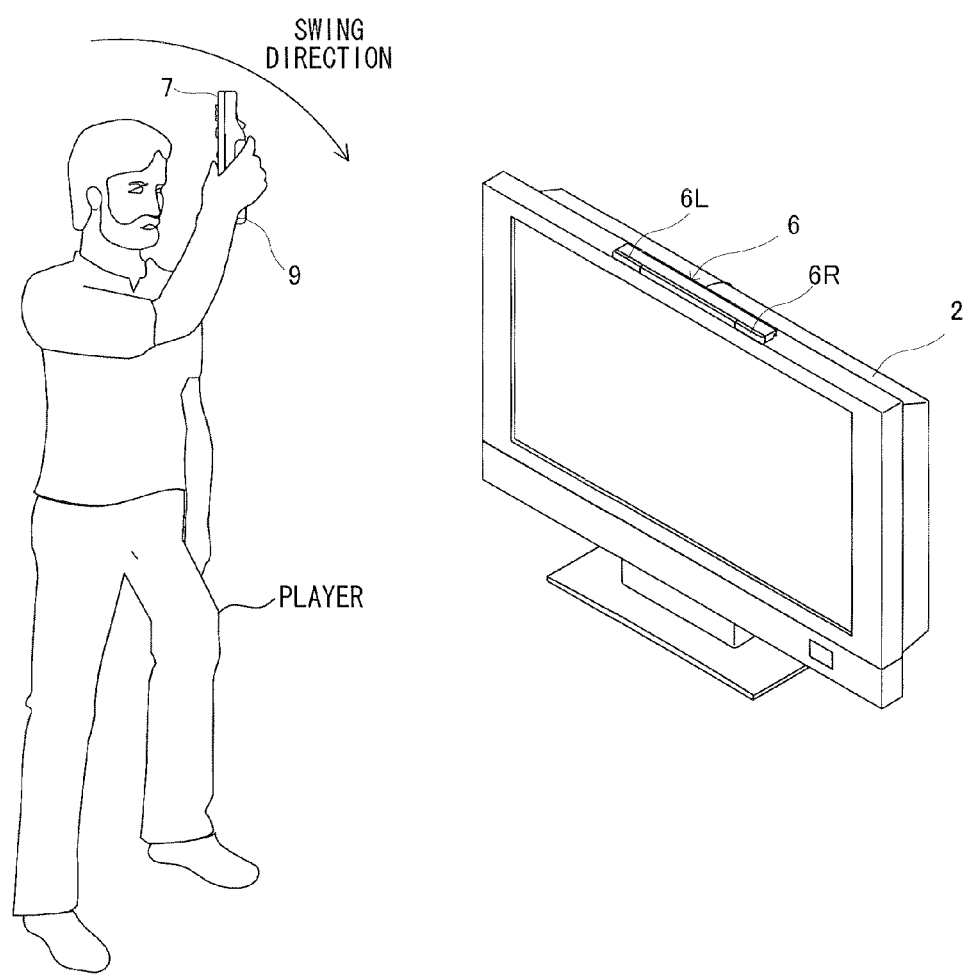
FIG. 14 is an explanation diagram for explaining a swing direction of the first controller 7 performed by the player.

Here, a swing operation of the first controller 7 performed by the player will be described. As described above, the angular velocities indicated by the angular velocity data 1271 are angular velocities in three directions, i.e., an angular velocity with respect to a roll angle around the Z-axis, an angular velocity with respect to a pitch angle around the X-axis, and an angular velocity with respect to a yaw angle around the Y-axis, as shown in FIG. 7. If the player has swung the first controller 7 from left to right (see FIG. 10), or if the player has swung the first controller 7 from right to left (see FIG. 11), the angular velocity with respect to the yaw angle around the Y-axis temporarily increases in accordance with the swing operation of the first controller 7. In addition, as shown in FIG. 14, if the player has swung down the first controller 7, the angular velocity with respect to the pitch angle around the X-axis temporarily increases in accordance with the swing operation of the first controller 7. Therefore, whether or not the player has started a swing operation of the first controller 7 in order to cause the player object 101 to perform an action of swinging the sword object 104, can be determined based on the angular velocity with respect to the yaw angle around the Y-axis and the angular velocity with respect to the pitch angle around the X-axis.

If the CPU 10 has determined that the attack flag 132 is set at OFF (NO in step S7), the CPU 10 determines whether or not an angular velocity of the first controller 7 indicated by the angular velocity data 1271 is equal to or larger than a predetermined value (step S8). As described above, whether or not a swing operation of the first controller 7 has been started can be determined based on the angular velocity with respect to the yaw angle around the Y-axis or the angular velocity with respect to the pitch angle around the X-axis. Therefore, in step S8, the CPU 10 which functions as start determination means determines whether or not the angular velocity with respect to the yaw angle around the Y-axis or the angular velocity with respect to the pitch angle around the X-axis indicated by the angular velocity data 1271 is equal to or larger than a predetermined value. In the present embodiment, if even one of the angular velocity with respect to the yaw angle around the Y-axis and the angular velocity with respect to the pitch angle around the X-axis is equal to or larger than a predetermined value, the CPU 10 determines "YES" in step S8, and the process proceeds to step S10 described later. On the other hand, if both the angular velocity with respect to the yaw angle around the Y-axis and the angular velocity with respect to the pitch angle around the X-axis are smaller than predetermined values, the CPU 10 determines "NO" in step S8, and the process proceeds to step S9 described later.

In this manner, the CPU 10 determines whether or not a swing operation of the first controller 7 has been started, based on the angular velocity data from the gyro sensor unit 9.

It is noted that a predetermined value used for determination of the angular velocity with respect to the yaw angle around the Y-axis, and a predetermined value used for determination of the angular velocity with respect to the pitch angle around the X-axis may be the same value, or may be different values. The predetermined values are set at values appropriate in accordance with a content of a game, or the like.

If the CPU 10 has determined that the angular velocities of the first controller 7 indicated by the angular velocity data 1271 are smaller than predetermined values (NO in step S8), since it is considered that an instruction of causing the player object 101 to attack has not been performed, the CPU 10 executes ready processing of causing the player object 101 to be ready with the sword object 104 (step S9). The detail of the ready processing will be described later with reference to FIG. 15.

If the CPU 10 has determined that an angular velocity of the first controller 7 indicated by the angular velocity data 1271 is equal to or larger than a predetermined value (YES in step S8), since it is considered that an instruction of causing the player object 101 to attack has been performed, the CPU 10 executes attack start processing of causing the player object 101 to start an action of swinging the sword object 104 (step S10). The detail of the attack start processing will be described later with reference to FIG. 16.

On the other hand, if, in step S7, the CPU 10 has determined that the attack flag 132 is set at ON (YES in step S7), the CPU 10 executes collision determination processing of determining whether or not the sword object 104 has hit at an enemy object (for example, the enemy object 102) (step S12). The detail of the collision determination processing will be described later with reference to FIG. 17 and FIG. 18. A sword swing animation of swinging the sword object 104 indicating a result of the collision determination processing is set through the collision determination processing. Therefore, after the CPU 10 has performed the collision determination processing in step S12, the CPU 10 starts reproducing the sword swing animation that has been set (step S13).

If the CPU 10 has determined "YES" in step S3, or after the CPU 10 has executed the processing of step S9, step S10, or step S13, the CPU 10 performs other processing (step S14). Specifically, the CPU 10 performs processing of, for example, moving a non-player object (for example, the enemy object 102), other than the player object 101 and the sword object 104, appearing in the virtual game space. Then, the CPU 10 causes the GPU 11*b* to generate a game image indicating a result of the processing from step S3 to step S14, and displays the generated game image on the liquid crystal television 2 (step S15).

After the processing of step S15, the CPU 10 determines whether or not an instruction of quitting the game has been performed, based on whether or not the power button 24, the reset button 25, or the operation button 72*h* has been operated (step S16). If the CPU 10 has determined that an instruction of quitting the game has not been performed (NO in step S16), the process returns to step S3, the game processing from step S3 is repeated. On the other hand, if the CPU 10 has determined that an instruction of quitting the game has been performed (YES in step S16), the CPU 10 ends the series of steps of game processing.

[Ready Process]

FIG. 15 is a flowchart showing in detail the ready processing in step S9 in FIG. 13. If, in step S8, the CPU 10 has determined that the angular velocities of the first controller 7 are smaller than predetermined values (NO in step S8), the CPU 10 calculates the orientation of the first controller 7, based on the angular velocity data 1271 (step S91). Specifically, the CPU 10 updates the orientation of the first controller 7 indicated by the estimated orientation data 128, based on the angular velocities indicated by the angular velocity data 1271, thereby calculating the current orientation of the first controller 7.

Subsequently, the CPU 10 calculates an orientation and a position of the sword object 104, based on the latest orientation of the first controller 7 indicated by the estimated orientation data 128 (step S92). Specifically, based on the orientation of the first controller 7 indicated by the estimated orientation data 128, the CPU 10 calculates an orientation of the sword object 104 such that the sword object 104 is directed in the same direction as the first controller 7. Then, the CPU 10 calculates a position of the sword object 104 in the virtual game space, in consideration of the position of the player object 101, the length of the arm of the player object 101, and the like which are indicated by the object data 139. The orientation and the position of the sword object 104 calculated in the processing of step S92 are stored, as the sword orientation data 129 and the sword position data 130, respectively, in the data storage area 126.

The orientation of the first controller 7 is reflected in the orientation and the position of the sword object 104 through the processing of step S92. Then, the display processing of step S15 is performed based on the sword orientation data 129, the sword position data 130, the object data 139, and the like, thereby displaying, on the liquid crystal television 2, a game image indicating a state in which the player object 101 is ready with the sword object 104 similarly to the posture of the player being ready with the first controller 7.

[Attack Start Processing]

FIG. 16 is a flowchart showing in detail the attack start processing in step S10 in FIG. 13. If the CPU 10 has determined that an angular velocity of the first controller 7 is equal to or larger than a predetermined value in step S8 (YES in step S8), the CPU 10 changes the orientation of the sword object 104 in the virtual game space (step S101). Specifically, the CPU 10 updates the sword orientation data 129, based on the angular velocities around 3 axes indicated by the angular velocity data 1271.

After the processing of step S101 is performed, the display processing of step S15 is performed, thereby displaying, on the liquid crystal television 2, a game image indicating a state in which the player object 101 swings the sword object 104 such that the orientation of the sword object 104 is the same as that of the first controller 7 at the time when the player starts an operation of swinging the first controller 7.

Subsequently to the processing of step S101, the CPU 10 which functions as direction determination means determines the swing direction of the first controller 7 (step S102). Specifically, the CPU 10 determines the swing direction (operation direction) of the first controller 7, based on the angular velocity with respect to the yaw angle around the Y-axis and the angular velocity with respect to the pitch angle around the X-axis indicated by the angular velocity data 1271. In the present embodiment, the swing direction of the first controller 7 is determined to be one of four directions of down direction, up direction, right direction, or left direction. The swing direction determined in step S102 is stored, as the swing direction data 131, in the data storage area 126.

Here, the down direction is the operation direction of the first controller 7 in the case where the player has performed an operation of swinging the first controller 7 from up to down (see FIG. 14). The up direction is the operation direction of the first controller 7 in the case where the player has performed an operation of swinging the first controller 7 from down to up. The right direction is the operation direction of the first controller 7 in the case where the player has performed an operation of swinging the first controller 7 from left to right (see FIG. 10). The left direction is the operation direction of the first controller 7 in the case where the player has performed an operation of swinging the first controller 7 from right to left (see FIG. 11).

It is noted that in the present embodiment, a case where the swing direction of the first controller 7 is determined to be one of the above four directions will be described. However, the swing direction to be determined is not limited to four directions. For example, the swing direction of the first controller 7 may be determined to be one of eight directions including a lower-right oblique direction, a lower-left oblique direction, an upper-right oblique direction, and an upper-left oblique direction in addition to the above four directions.

Here, the processing of determining the swing direction in step S102 is executed subsequently to the processing of step S8 in the case where the CPU 10 has determined that an angular velocity of the first controller 7 is equal to or larger than a predetermined value in step S8. That is, in the present embodiment, the processing of determining the swing direction of the first controller 7 is performed when the CPU 10 has determined that an operation of swinging the first controller 7 has been started.

After the CPU 10 has determined the swing direction of the first controller 7, the CPU 10 sets the attack flag 132 to ON (step S103). By the attack flag 132 being set to ON, the CPU 10 determines "YES" in step S7, and the process proceeds to collision determination processing described below.

[Collision Determination Processing]

Figure 17:
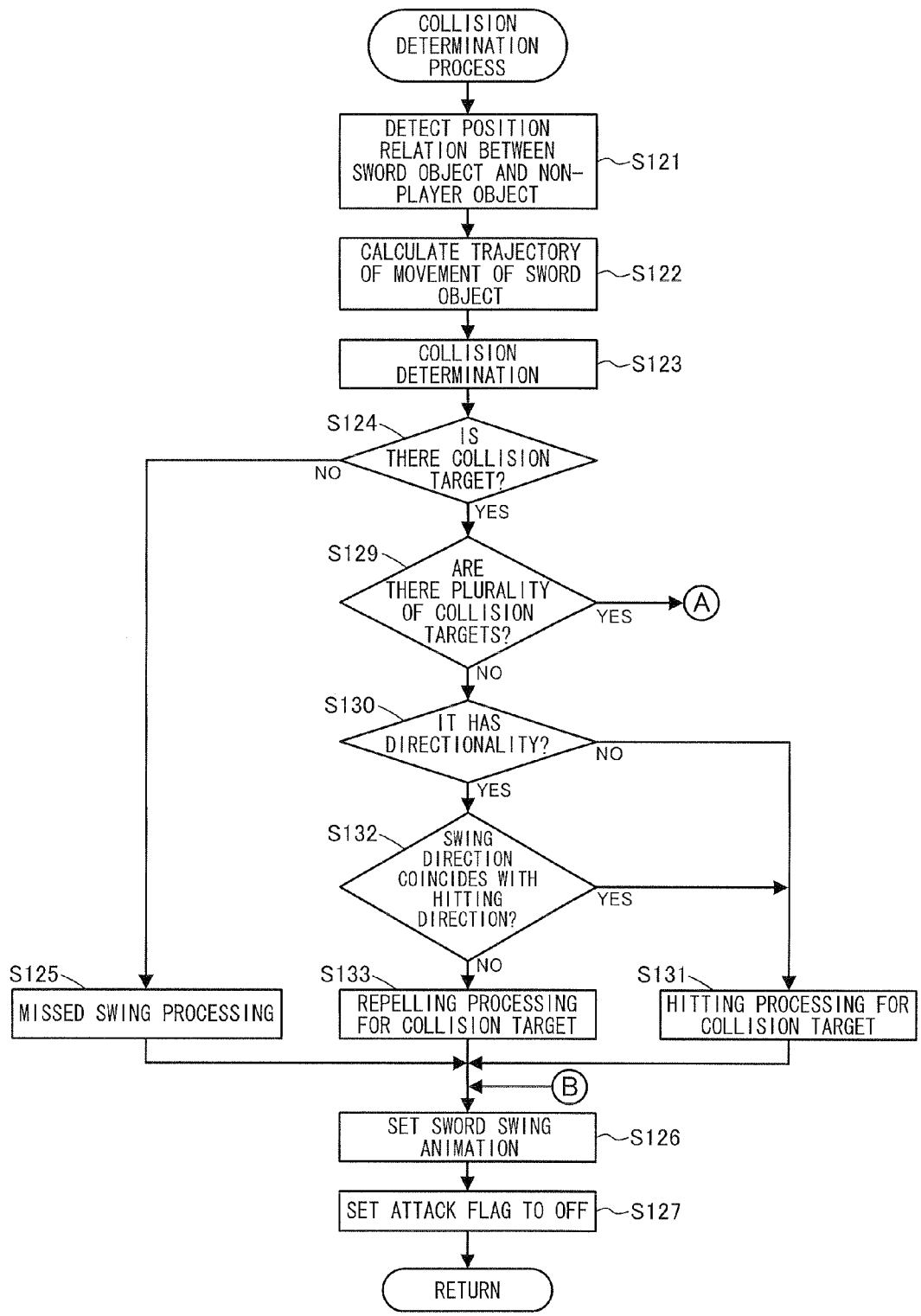
FIG. 17 is a flowchart showing, in detail, collision determination processing in step S12 in FIG. 13.

FIG. 17 and FIG. 18 are flowcharts showing in detail the collision determination processing in step S12 in FIG. 13. If the CPU 10 has determined that the attack flag 132 is set at ON in step S7 (YES in step S7), the CPU 10 which functions as position relation detection means detects a position relation between the sword object 104 and an enemy object by referring to the sword position data 130 and the object data 139 stored in the data storage area 126 (step S121). A result of the detection in the processing of step S121 is stored, as the position relation data 133, in the data storage area 126.

Subsequently to the processing of step S121, the CPU 10 calculates a trajectory of a movement of the sword object 104, based on the sword orientation data 129, the sword position data 130, and the swing direction data 131 (step S122). That is, the CPU 10 calculates what trajectory the sword object 104 that is in the orientation indicated by the sword orientation data 129 and at the position indicated by sword position data 130 will move on when the sword object 104 is swung in the direction corresponding to the swing direction indicated by the swing direction data 131. Then, the CPU 10 which functions as collision determination means determines whether or not the sword object 104 will collide with an enemy object that is a determination target (step S123). Specifically, the CPU 10 determines whether or not the sword object 104 will collide with the enemy object (for example, the enemy object 102), by referring to the position relation data 133 obtained in the processing of step S121, based on whether or not the enemy object is present on the trajectory of the movement calculated in the processing of step S122.

After the CPU 10 has performed the collision determination in step S123, the CPU 10 determines, based on a result of the collision determination, whether or not a determination target (hereinafter, referred to as a "collision target") that the sword object 104 will collide with is present (step S124). If the CPU 10 has determined that a collision target is not present (NO in step S124), the CPU 10 performs the missed swing processing of swinging the sword object 104 so as to miss (step S125).

After the CPU 10 has performed the missed swing processing in step S125, the CPU 10 sets a sword swing animation (step S126). Specifically, the CPU 10 stores the animation setting data 138 indicating the missed swing processing in the data storage area 126. Then, the CPU 10 sets the attack flag 132 which has been set to ON in the processing of step S103, to OFF (step S127).

After the CPU 10 has performed the processing of step S127, the process proceeds to step S13. That is, the CPU 10 starts reproducing a sword swing animation corresponding to the content set in the processing of step S126 (step S13). Here, the animation setting data 138 indicating the "missed swing processing" is stored in the data storage area 126 by the CPU 10 performing the processing of step S125 and then the processing of step S126. Therefore, the CPU 10 selects the missed swing processing animation data from among the sword swing animation data 137, and starts reproducing the selected data. If the CPU 10 starts reproducing the missed swing processing animation data in this manner, the CPU 10 continues to determine "YES" in step S3 and thereby repeats the display processing of step S15, until the reproduction of the missed swing processing animation data is finished. As a result, a scene in which the player object 101 swings the sword object 104 and misses is displayed on the liquid crystal television 2.

On the other hand, if the CPU 10 has determined that a collision target that the sword object 104 will collide with is present (YES in step S124), the CPU 10 determines whether or not a plurality of collision targets are present (step S129). If the CPU 10 has determined that a plurality of collision targets are present (YES in step S129), the process proceeds to step S136 (see FIG. 18) described later.

If the CPU 10 has determined that one collision target is present (NO in step S129), the CPU 10 determines whether or not the collision target has a directionality (step S130). Specifically, the CPU 10 determines whether or not a piece of the directionality data 135 corresponding to the collision target is stored in the data storage area 126. If a piece of the directionality data 135 corresponding to the collision target is stored in the data storage area 126, the CPU 10 can determine that the collision target has a directionality. On the other hand, if a piece of the directionality data 135 corresponding to the collision target is not stored in the data storage area 126, the CPU 10 can determine that the collision target does not have a directionality.

FIG. 19 is a screen view showing an example of an animation displayed on the liquid crystal television 2 in the case where the player has swung the first controller 7 from left to right. No piece of directionality data 135 is set for an enemy object 106 shown in FIG. 19. In the case where the sword object 104 collides with a collision target such as the enemy object 106 that does not have a directionality, the hitting processing is performed for the collision target, irrespective of the swing direction of the first controller 7.

If the CPU 10 has determined that the collision target does not have a directionality (NO in step S130), the CPU 10 which functions as collision processing determination means performs the hitting processing for the collision target (step S131). Specifically, the CPU 10 executes processing of causing the sword object 104 to hit at the collision target (in this case, the enemy object 106), and damaging the collision target that the sword object 104 has hit at.

Also in the case where the processing of step S131 has been performed, the above-described processing from the step S126 is performed. In the case where the processing of step S126 is to be performed subsequently to the processing of step S131, the CPU 10 stores the animation setting data 138 indicating the "hitting processing" in the data storage area 126 in the processing of step S126. In this case, in step S13, the CPU 10 selects the hitting processing animation data from among the sword swing animation data 137, and starts reproducing the selected data. If the CPU 10 starts reproducing the hitting processing animation data in this manner, the CPU 10 continues to determine "YES" in step S3 and thereby repeats the display processing of step S15, until the reproduction of the hitting processing animation data is finished. As a result, a scene in which the sword object 104 hits at the collision target and the collision target is damaged is displayed on the liquid crystal television 2. FIG. 19 shows a game image displayed on the liquid crystal television 2 in the case where, in step S131, the hitting processing is performed for the enemy object 106 which is the collision target. It is noted that since the enemy object 106 does not have a directionality, the hitting processing is performed for the enemy object 106, no matter what direction the sword object 104 has been swung in for the enemy object 106 (no matter what direction the first controller 7 has been swung in).

On the other hand, if the CPU 10 has determined that the collision target has a directionality (YES in step S130), the CPU 10 determines whether or not, in the position relation detected in the processing of step S121, the swing direction of the first controller 7 determined in the processing of step S102 (see FIG. 16) coincides with a hitting direction indicated by the piece of the directionality data 135 set for the collision target that the sword object 104 will collide with (step S132). If the CPU 10 has determined that the swing direction of the first controller 7 coincides with the hitting direction (YES in step S132), the process proceeds to step S131. That is, the hitting processing is performed for the collision target having a directionality (for example, the enemy object 102). In this manner, if the CPU 10 has determined, for the collision target having a directionality, that the swing direction coincides with the hitting direction, for example, an animation shown in FIG. 10 is displayed on the liquid crystal television 2.

If the CPU 10 has determined that the swing direction of the first controller 7 does not coincide with the hitting direction (NO in step S132), the CPU 10 performs the repelling processing for the collision target (step S133). Specifically, the CPU 10 causes the collision target having a directionality (for example, the enemy object 102) to repel the sword object 104.

Also in the case where the processing of step S133 has been performed, the above-described processing from the step S126 is performed. In the case where the processing of step S126 is to be performed subsequently to the processing of step S133, the CPU 10 stores the animation setting data 138 indicating the "repelling processing" in the data storage area 126 in the processing of step S126. In this case, in step S13, the CPU 10 selects the repelling processing animation data from among the sword swing animation data 137, and starts reproducing the selected data. If the CPU 10 starts reproducing the repelling processing animation data in this manner, the CPU 10 continues to determine "YES" in step S3 and thereby repeats the display processing of step S15, until the reproduction of the repelling processing animation data is finished. As a result, a scene in which the sword object 104 is repelled by the collision target having a directionality (for example, the enemy object 102) is displayed on the liquid crystal television 2 (see FIG. 11).

As described above, the CPU 10 executes the processing from step S130 to step S133, thereby determining, based on the swing direction of the first controller 7 determined in the processing of step S102, whether or not to perform the hitting processing for the collision target that the sword object 104 will collide with (in the present embodiment, whether to perform the hitting processing or the repelling processing).

For example, for the enemy object 102 having a directionality (see FIG. 10 and FIG. 11), a piece of the directionality data 135 indicating the right direction as the hitting direction is stored in the data storage area 126. Therefore, if the swing direction of the first controller 7 determined in the processing of step S102 is the right direction, the swing direction coincides with the hitting direction. Therefore, the hitting processing is performed for the enemy object 102, and an animation indicating the corresponding scene is displayed on the liquid crystal television 2 (see FIG. 10). On the other hand, if the swing direction of the first controller 7 determined in the processing of step S102 is the left direction, the swing direction does not coincide with the hitting direction. Therefore, the repelling processing is performed for the enemy object 102, and an animation indicating the corresponding scene is displayed on the liquid crystal television 2 (see FIG. 11).

It is noted that the determination processing in step S132 is performed in consideration of the position relation between the sword object 104 and the non-player object detected in the processing of step S121. For example, the hitting direction indicated by the piece of the directionality data 135 corresponding to the enemy object 102 is different between a state in which the enemy object 102 faces the player object 101 (see FIG. 10 and FIG. 11) and a state in which the enemy object 102 has its back to the player object 101 (not shown). That is, when the enemy object 102 faces the player object 101, the hitting direction of the enemy object 102 is the right direction, but when the enemy object 102 has its back to the player object 101, the hitting direction of the enemy object 102 is the left direction. Thus, the hitting direction indicated by the directionality data 135 changes depending on the position relation between the sword object 104 (player object 101) and the non-player object. Therefore, by considering the position relation between the sword object 104 and the non-player object to determine whether or not to perform the hitting processing, the determination can be accurately performed.

In addition, for example, also in the case where the hitting direction of the enemy object 102 changes by the enemy object 102 turning the shield upward, or in the case where an object that is an obstacle is present between the sword object 104 and the enemy object 102, it is effective to consider the position relation between the sword object 104 and the non-player object to determine whether or not to perform the hitting processing.

If the CPU 10 has determined that a plurality of collision targets are present in step S129 (YES in step S129), the CPU 10 which functions as priority rank setting means sets priority ranks for the plurality of collision targets, based on the position relation between objects detected in the processing of step S121, and the swing direction of the first controller 7 determined in the processing of step S102 (step S136). Specifically, the CPU 10 sets priority ranks for the plurality of collision targets such that, in the position relation between objects detected in step S121, when the first controller 7 is swung in the swing direction determined in step S102, the priority rank of the collision target that the sword object 104 will first collide with is the highest.

Figure 20:
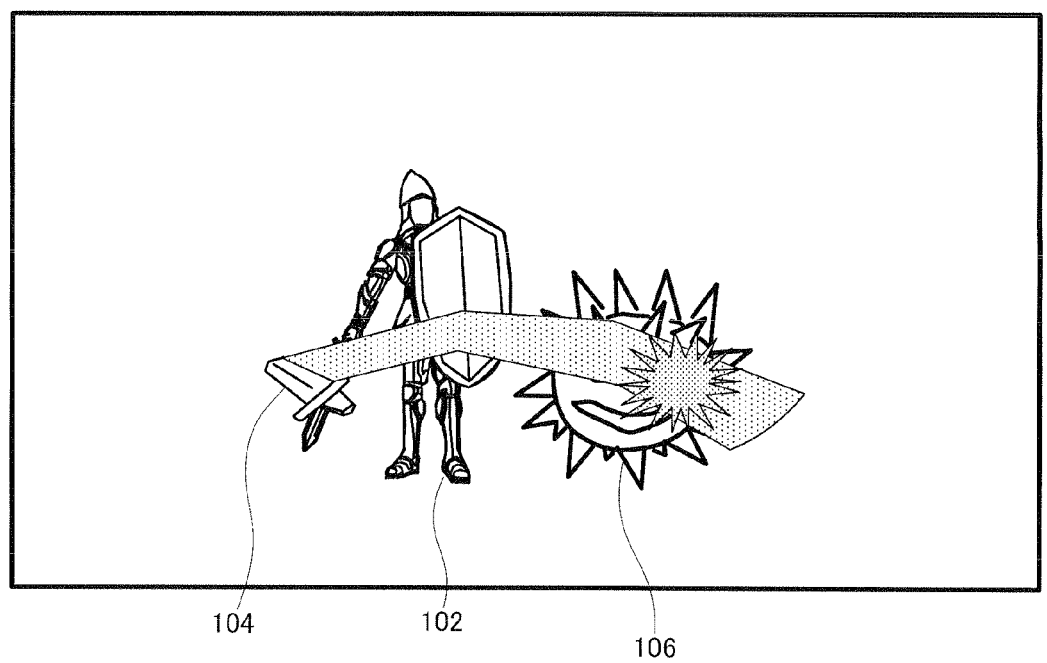
FIG. 20 is a screen view showing an example of an animation displayed on the liquid crystal television 2 in the case where the player has swung the first controller 7 from right to left.
Figure 20:
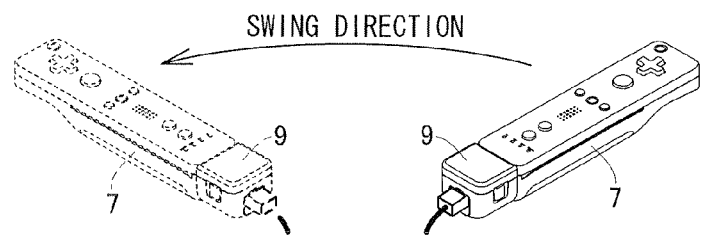

For example, in the state where the enemy object 102 and the enemy object 106 that are collision targets are present side by side as shown in FIG. 20, when the first controller 7 has been swung from right to left, the collision target that the sword object 104 will first collide with is the enemy object 106. Therefore, the CPU 10 sets priority ranks for the enemy object 102 and the enemy object 106 such that the priority rank of the enemy object 106 is higher than the priority rank of the enemy object 102.

Figure 21:
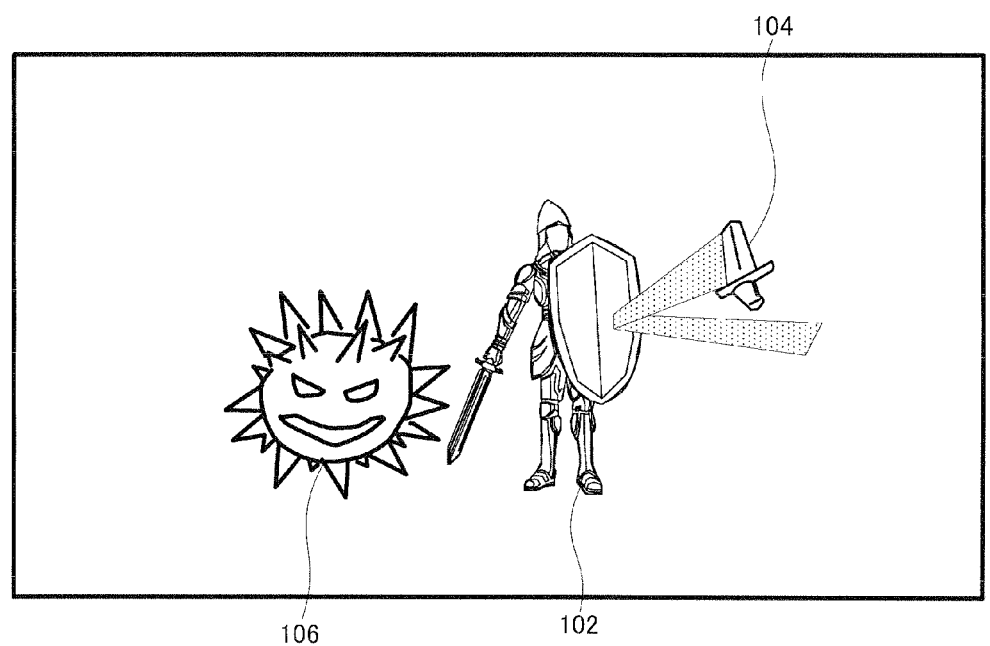
FIG. 21 is a screen view showing an example of an animation displayed on the liquid crystal television 2 in the case where the player has swung the first controller 7 from right to left.
Figure 21:
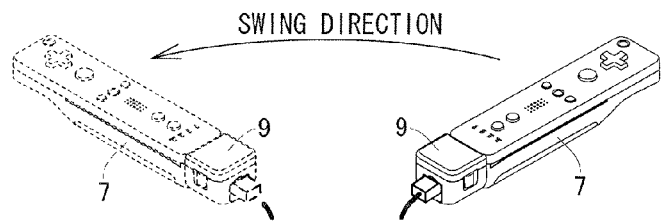

In addition, for example, in the state where the enemy object 106 and the enemy object 102 that are collision targets are present side by side as shown in FIG. 21, when the first controller 7 has been swung from right to left, the collision target that the sword object 104 will first collide with is the enemy object 102. Therefore, the CPU 10 sets priority ranks for the enemy object 102 and the enemy object 106 such that the priority rank of the enemy object 102 is higher than the priority rank of the enemy object 106.

In this manner, if the CPU 10 has determined that the sword object 104 will collide with a plurality of collision targets, the CPU 10 sets priority ranks for the plurality of collision targets, based on the swing direction of the first controller 7, and the position relation between the sword object 104 and the non-player objects. The priority ranks set in the processing of step S136 are stored as the priority rank data 136 in the data storage area 126.

Subsequently to the processing of step S136, the CPU 10 determines whether or not the collision target having the highest priority rank has a directionality (step S137). Specifically, the CPU 10 specifies the collision target having the highest priority rank from among the plurality of collision targets that the sword object 7 might collide with, by referring to the priority rank data 136 stored in the data storage area 126. Then, the CPU 10 determines whether or not the specified collision target has a directionality, based on whether or not a piece of the directionality data 135 corresponding to the specified collision target is stored in the data storage area 126.

If the CPU 10 determines that the collision target having the highest priority rank does not have a directionality (NO in step S137), the CPU 10 performs the hitting processing for the collision target having the highest priority rank (step S138). The hitting processing in step S138 is performed in the same manner as in the hitting processing performed in step S131 after the CPU 10 has determined "NO" in step S130. After the processing of step S138 has been performed, the process proceeds to step S126 (see FIG. 17). In the present embodiment, an example of collision targets having no directionality is the enemy object 106. If the enemy object 106 is set so as to be a collision target having the highest priority rank and then the hitting processing is performed, a hitting processing animation indicating a scene in which the sword object 104 hits at the enemy object 106 is reproduced as shown in FIG. 20.

If the CPU 10 has determined that the collision target having the highest priority rank has a directionality (YES in step S137), the CPU 10 determines whether or not the swing direction of the first controller 7 coincides with the hitting direction set for the collision target having the highest priority rank (step S139). Specifically, the CPU 10 determines the hitting direction set, in advance, for the collision target having the highest priority rank, by referring to the piece of the directionality data 135 corresponding to the collision target having the highest priority rank. Then, the CPU 10 determines whether or not the swing direction (swing direction indicated by the swing direction data 131) determined in the processing of step S102 coincides with the hitting direction of the collision target having the highest priority rank.

Figure 22:
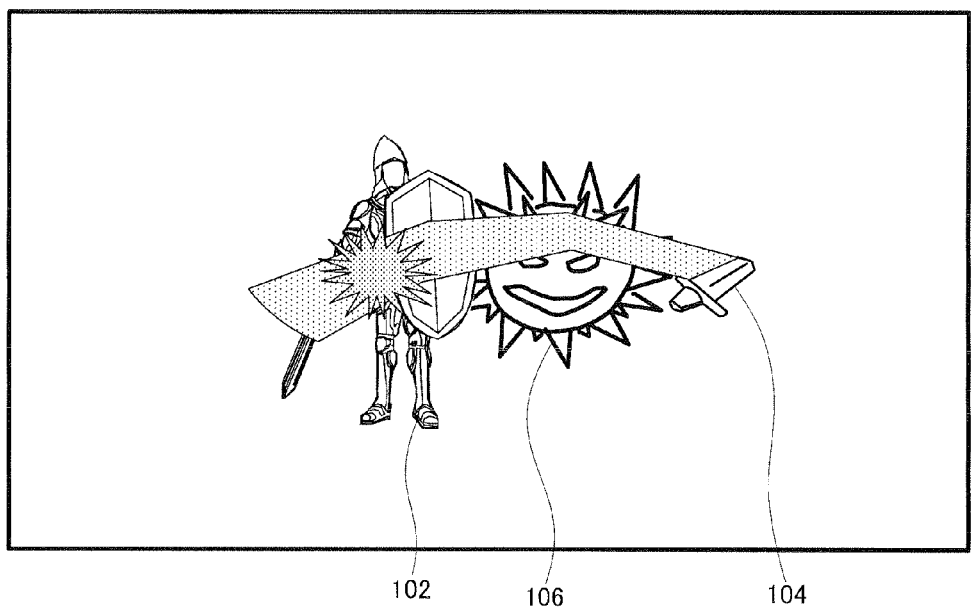
FIG. 22 is a screen view showing an example of an animation displayed on the liquid crystal television 2 in the case where the player has swung the first controller 7 from right to left.
Figure 22:
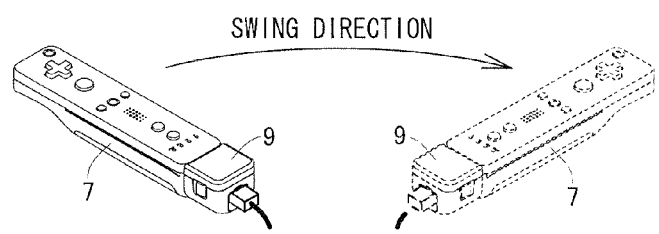

If the CPU 10 has determined that the swing direction coincides with the hitting direction (YES in step S139), the CPU 10 performs the hitting processing of step S138 for the collision target having the highest priority rank. In the present embodiment, an example of collision targets having a directionality is the enemy object 102. If the enemy object 102 is set so as to be a collision target having the highest priority rank and then the hitting processing is performed, a hitting processing animation indicating a scene in which the sword object 104 hits at the enemy object 102 is reproduced as shown in FIG. 22.

On the other hand, if the CPU 10 has determined that the swing direction does not coincide with the hitting direction (NO in step S139), the CPU 10 performs the repelling processing for the collision target having the highest priority rank (step S140). The repelling processing in step S140 is performed in the same manner as in the repelling processing performed in step S133. After the processing of step S140 has been performed, the process proceeds to step S126 (see FIG. 17). For example, if the enemy object 102 is set so as to be a collision target having the highest priority rank and then the repelling processing is performed, a repelling processing animation indicating a scene in which the sword object 104 is repelled by the enemy object 102 is reproduced as shown in FIG. 21.

As described above, in the case where priority ranks are set for a plurality of collision targets, the CPU 10 determines whether to perform the hitting processing or the repelling processing for the collision target having the highest priority rank.

Functional Effects of the Present Embodiment

As described above, in the present embodiment, if the CPU 10 has determined that the sword object 104 will collide with the enemy object, the CPU 10 determines whether or not to perform the hitting processing for the enemy object, based on the swing direction of the first controller 7. That is, when the sword object 104 has collided with an enemy object, the CPU 10 does not unconditionally perform the hitting processing, but determines whether or not to perform the hitting processing, based on the swing direction of the first controller 7. Therefore, a representation indicating a response of the enemy object upon collision can be easily switched in accordance with the swing direction of the first controller 7 (that is, the direction in which the sword object 104 collides with the enemy object).

In addition, in the present embodiment, whether or not to perform the hitting processing for an enemy object is determined in consideration of not only the swing direction of the first controller 7 but also the position relation between the sword object 104 and the enemy object. Therefore, even if the position relation (for example, the direction and the posture of the enemy object 102) between the sword object 104 and an enemy object that will be attacked by the sword object 104 has changed, whether or not to perform the hitting processing for the enemy object can be appropriately determined.

In addition, in the present embodiment, in the case where the sword object 104 might collide with a plurality of enemy objects, priority ranks are set for the plurality of enemy objects, and whether or not to perform the hitting processing is determined for an enemy object having the highest priority rank. Therefore, whether or not to perform the hitting processing can be appropriately determined for an enemy object for which whether or not to perform the hitting processing should be determined.

In addition, in the present embodiment, the swing direction of the first controller 7 is determined at a timing when it has been determined that an operation of swinging the first controller 7 so as to perform an instruction of attacking with the sword object 104 has been started. In other words, the swing direction of the first controller 7 is determined before the sword object 104 collides with an enemy object. Therefore, whether or not to perform the hitting processing for an enemy object can be determined at an easier timing than in the case where the swing direction of the first controller 7 is determined when the sword object 104 has collided with an enemy object. As a result, it becomes possible to reduce a time lag from when an operation of swinging the first controller 7 is started, to when a reproduction of a sword swing animation is started.

In addition, in the present embodiment, the determination processing of determining the swing direction of the first controller 7, and the collision determination of whether or not the sword object 104 will collide with an enemy object, are performed based on angular velocity data outputted from the gyro sensor unit 9. Therefore, the above determination processing and collision processing can be performed more accurately than, for example, in the case where angular velocity data outputted from the acceleration sensor 701 is used.

[Modification of Collision Determination Processing]

In the above embodiment, a case where if the sword object 104 might collide with a plurality of collision targets, whether or not to perform the hitting processing is determined only for a collision target having the highest priority rank, is described. In addition to this, if it has been determined that the hitting processing is to be performed for the collision target having the highest priority rank, whether or not to perform the hitting processing may further be determined for a collision target having the next highest priority rank.

Figure 23:
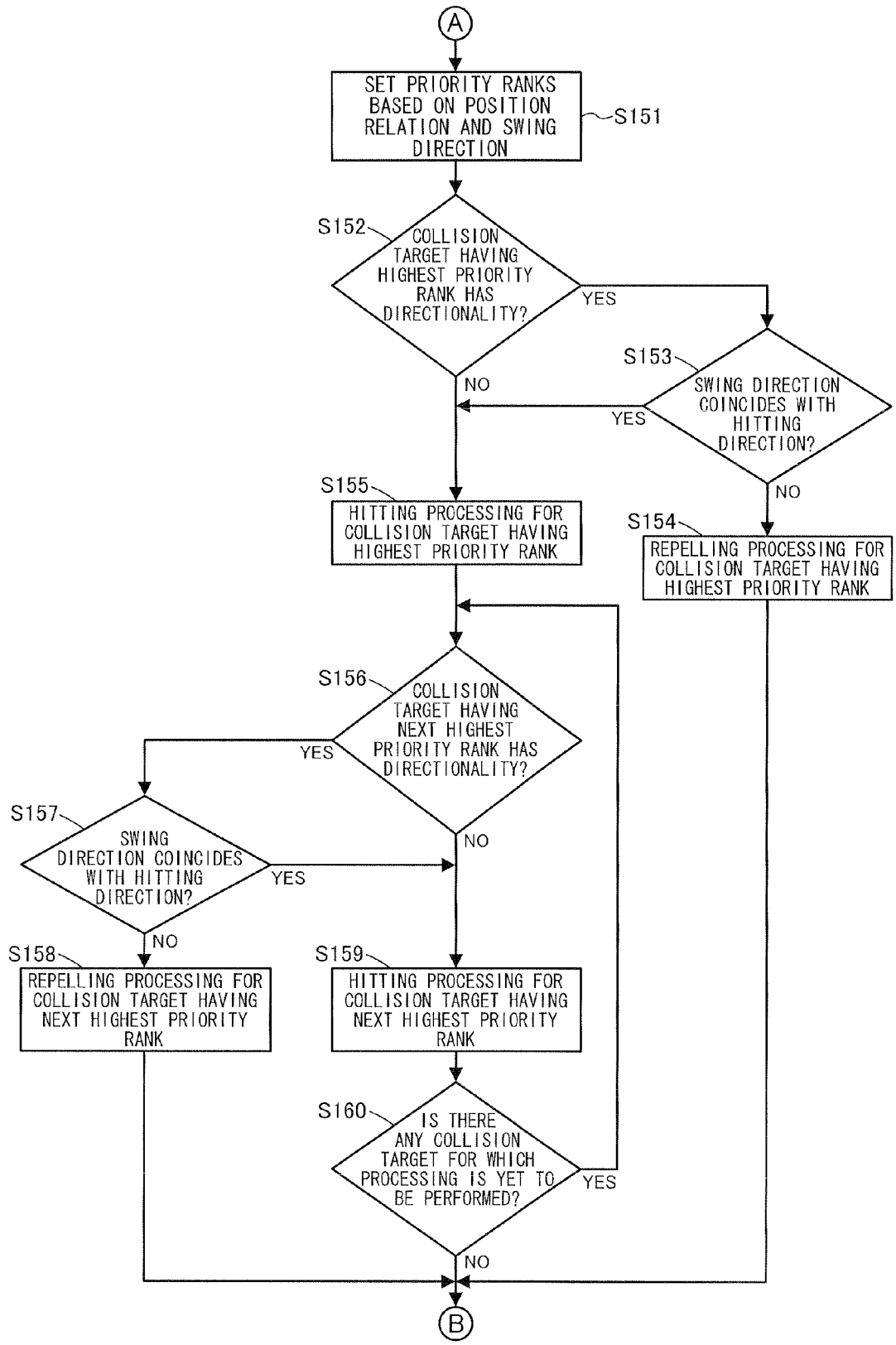
FIG. 23 is a flowchart showing a modification of the collision determination processing.

Hereinafter, with reference to FIG. 23, a modification of the collision determination processing will be described. Here, FIG. 23 is a flowchart showing the modification of the collision determination processing. In the present modification, if, in step S129 (see FIG. 17), the CPU 10 has determined that a plurality of collision targets are present (YES in step S129), the CPU 10 performs processing from step S151 described below, instead of the processing from step S136 to step S140 in FIG. 18.

If the CPU 10 has determined that a plurality of collision targets are present (YES in step S129), the CPU 10 sets priority ranks for the plurality of determination targets, based on the position relation between objects, and the swing direction of the first controller 7 (step S151), as in the processing of step S136.

Then, the CPU 10 determines whether or not the collision target having the highest priority rank has a directionality (step S152), as in the processing of step S137. If the CPU 10 has determined that the collision target having the highest priority rank has a directionality (YES in step S152), the CPU 10 determines whether or not the swing direction of the first controller 7 coincides with the hitting direction set, in advance, for the collision target having the highest priority rank (step S153), as in the processing of step S139. Here, if the CPU 10 has determined that the swing direction does not coincide with the hitting direction (NO in step S153), the CPU 10 performs the repelling processing for the collision target having the highest priority rank (step S154), as in the processing of step S140. After the processing of step S154 has been performed, the process proceeds to step S126. In this case, a repelling processing animation indicating a scene in which the sword object 104 is repelled by the enemy object 102 which is the collision target having the highest priority rank is reproduced as shown in FIG. 21.

On the other hand, if the CPU 10 has determined that the collision target having the highest priority rank does not have a directionality (NO in step S152), or if the CPU 10 has determined that the swing direction coincides with the hitting direction (YES in step S153), the CPU 10 performs the hitting processing for the collision target having the highest priority rank (step S155), as in the processing of step S138.

In the case where the hitting processing is to be performed for the collision target having the highest priority rank, the sword object 104 that has cut the collision target having the highest priority rank is to collide with the collision target having the next highest priority rank. Accordingly, in the present modification, after the CPU 10 has performed the processing of step S155, the CPU 10 performs processing from step S156 described below, for a collision target having a lower priority rank than the collision target having the highest priority rank.

After the CPU 10 has performed the processing of step S155, the CPU 10 determines whether or not the collision target having the next highest priority rank has a directionality (step S156). Specifically, the CPU 10 determines whether or not a piece of the directionality data 135 corresponding to an enemy object that is the collision target having the next highest priority rank is stored in the data storage area 126.

If the CPU 10 has determined that the collision target having the next highest priority rank has a directionality (YES in step S156), the CPU 10 determines whether or not the swing direction of the first controller 7 coincides with the hitting direction set, in advance, for the collision target having the next highest priority rank (step S157). Specifically, by referring to the piece of the directionality data 135 corresponding to the collision target having the next highest priority rank which is the determination target in the processing of step S156, the CPU 10 specifies the hitting direction of the collision target having the next highest priority rank. Then, the CPU 10 determines whether or not the swing direction indicated by the swing direction data 131 coincides with the specified hitting direction of the collision target having the next highest priority rank.

If the CPU 10 has determined that the swing direction of the first controller 7 does not coincide with the hitting direction of the collision target having the next highest priority rank (NO in step S157), the CPU 10 performs the repelling processing for the collision target having the next highest priority rank (step S158). The repelling processing in step S158 is performed in the same manner as in the processing of step S140, except that the repelling processing is performed not for the collision target having the highest priority rank but for the collision target having the next highest priority rank.

After the CPU 10 has performed the processing of step S158, the process proceeds to step S126. In this case, the hitting processing is performed for the collision target having the highest priority rank, and the repelling processing is performed for the collision target having the next highest priority rank. Therefore, an animation as shown in FIG. 24 is reproduced. Here, FIG. 24 is a screen view showing an example of an animation displayed on the liquid crystal television 2 in the case where the enemy object 106 is set to be the collision target having the highest priority rank, the enemy object 102 adjacent to the enemy object 106 is set to be the collision target having the next highest priority rank, and the swing direction of the first controller 7 does not coincide with the hitting direction of the enemy object 102. FIG. 24 shows a scene in which the hitting processing is performed for the enemy object 106, and the repelling processing is performed for the enemy object 102 adjacent to the enemy object 106.

If the CPU 10 has determined that the collision target having the next highest priority rank does not have a directionality (NO in step S156), or if the CPU 10 has determined that the swing direction coincides with the hitting direction (YES in step S157), the CPU 10 performs the hitting processing for the collision target having the next highest priority rank (step S159). The hitting processing in step S159 is performed in the same manner as in the processing of step S138, except that the hitting processing is performed not for the collision target having the highest priority rank but for the collision target having the next highest priority rank.

After the CPU 10 has performed the processing of step S159, the CPU 10 determines whether or not a collision target for which whether to perform the hitting processing or the repelling processing is yet to be determined is present (step S160). If the CPU 10 has determined that a collision target for which whether to perform the hitting processing or the repelling processing is yet to be performed is present (YES in step S160), the process returns to step S156. That is, if the plurality of collision targets include a collision target other than the collision target for which the hitting processing has been performed in the processing of step S155 and the collision target for which the hitting processing has been performed in the processing of step S159, the process returns to step S156.

If the CPU 10 has determined that a collision target for which whether to perform the hitting processing or the repelling processing is yet to be performed is not present (NO in step S160), the process proceeds to step S126. In this case, the hitting processing is performed for the collision target having the highest priority rank and the collision target having the next highest priority rank. Therefore, an animation as shown in FIG. 25 is reproduced. Here, FIG. 25 is a screen view showing an example of an animation displayed on the liquid crystal television 2 in the case where the enemy object 106 on the left side is set to be the collision target having the highest priority rank, another enemy object 106 adjacent to the enemy object 106 on the left side is set to be the collision target having the next highest priority rank, and the enemy object 102 adjacent to the other enemy object 106 is set to be the collision target having the lowest priority rank. Here, the two enemy objects 106 do not have directionalities, and the swing direction of the first controller 7 coincides with the hitting direction of the enemy object 102. Therefore, as shown in FIG. 25, a scene in which the sword object 104 is fully swung and the hitting processing is performed for the two enemy objects 106 and the enemy object 102 is displayed.

On the other hand, in the case where, after the CPU 10 has determined "YES" in the processing of step S160 and the process returns to step S156, the repelling processing of step S158 is performed for the collision target having the lowest priority rank, an animation as shown in FIG. 26 is reproduced. Here, FIG. 26 is a screen view showing an example of an animation displayed on the liquid crystal television 2 in the case where the enemy object 106 on the right side is set to be the collision target having the highest priority rank, another enemy object 106 adjacent to the enemy object 106 on the right side is set to be the collision target having the next highest priority rank, and the enemy object 102 adjacent to the other enemy object 106 is set to be the collision target having the lowest priority rank. Here, the two enemy objects 106 do not have directionalities, and the swing direction of the first controller 7 does not coincide with the hitting direction of the enemy object 102. Therefore, as shown in FIG. 26, a scene in which the sword object 104 hits at the two enemy objects 106 and then is repelled by the enemy object 102 is displayed.

It is noted that the modification of the collision determination processing described above can be realized by preparing, for example, five pieces of animation data of: animation data for displaying a scene in which the sword object 104 is fully swung; animation data for displaying a scene in which the sword object 104 starts a swing action and stops at the first collision target; animation data for displaying a scene in which the sword object 104 starts a swing action and stops at the second collision target; animation data for displaying a scene in which the sword object 104 starts a swing action and stops at the third collision target; and animation data for displaying a scene in which the sword object 104 is repelled.

[Other Modifications]

The present invention is not limited to the above embodiment, and may be realized as the following modes, for example. That is, although the above embodiment describes the case where whether or not to perform the hitting processing for a collision target is determined in consideration of a position relation between the sword object 104 and a non-player object, whether or not to perform the hitting processing for a collision target may be determined only based on the swing direction of the first controller 7, without consideration of a position relation between objects.

In addition, the above embodiment describes the case where, if the sword object 104 might collide with a plurality of collision targets, priority ranks are set for the plurality of collision targets, and whether or not to perform the hitting processing is determined only for the collision target having the highest priority rank. In addition, the above modification describes the case where, after priority ranks have been set for a plurality of collision targets, if it has been determined that the hitting processing is to be performed for a certain collision target, whether or not to perform the hitting processing is determined for a collision target having the highest priority rank next to the certain collision target. Instead of the above cases, whether or not to perform the hitting processing may be determined for all of the plurality of collision targets without setting priority ranks for them.

In addition, the above embodiment describes the case where, when an operation of swinging the first controller 7 is started (when an angular velocity indicated by the angular velocity data 1271 has become equal to or larger than a predetermined value), the swing direction of the first controller 7 is determined. Instead, the swing direction of the first controller 7 may be determined at a timing when it has been determined that the sword object 104 has collided with an enemy object that is a collision target. Specifically, the processing of step S102 in FIG. 16 may be performed at the time when the CPU 10 has determined "YES" in step S124 (see FIG. 17), for example.

In addition, the above embodiment describes the case where, when an operation of swinging the first controller 7 is started (when an angular velocity indicated by the angular velocity data 1271 has become equal to or larger than a predetermined value), a trajectory of a movement of the sword object 104 is calculated and then a collision with an enemy object is determined. Instead, the angular velocity data may be obtained every frame even after an operation of swinging the first controller 7 has been started, and the movement (action) of the sword object 104 may be controlled in real time, based on the obtained angular velocity data. In this case, collision is determined based on the position of an enemy object, and the orientation and the position of the sword object 104 calculated based on the obtained angular velocity data.

In addition, the above embodiment describes the case where priority ranks are set after it has been determined that a plurality of collision objects are present. However, priority ranks may be set before the collision determination in step S123 (see FIG. 17).

In addition, data indicating the size of a determination area for collision determination may be used as another example of the directionality data 135. Specifically, the swing direction of the first controller 7 is determined when the ready processing (see FIG. 15) is performed, or at any timing before the collision determination in step S123, and the size of the determination area for collision determination set for an enemy object that is a collision target is changed in accordance with the determined swing direction. For example, when the player has swung the first controller 7 from right to left, the size of the determination area of a collision target is relatively increased, and on the other hand, when the player has swung the first controller 7 from left to right, the size of the determination area of a collision target is relatively decreased. As a result, when the player has swung the first controller 7 from right to left, a collision is likely to occur because the size of the determination area of a collision target is relatively large, and on the other hand, when the player has swung the first controller 7 from left to right, a collision is not likely to occur because the size of the determination area of a collision target is relatively small, thereby obtaining the same effect as in the case of using data indicating the direction in which a target can be hit.

In addition, the above embodiment uses the 2-axis gyro sensor 96 and the 1-axis gyro sensor 97 for detecting angular velocities around 3 axes. However, any number of gyro sensors may be used, and any combination of their types may be adopted, as long as they can detect angular velocities around 3 axes.

In addition, in the above embodiment, the 3 axes around which the gyro sensors 96 and 97 detect angular velocities are set so as to coincide with the 3 axes (X, Y, and Z axes) around which the acceleration sensor 701 detects angular velocities. However, the 3 axes around which the gyro sensors 96 and 97 detect angular velocities may not coincide with the 3 axes around which the acceleration sensor 701 detects angular velocities.

In addition, the second controller 8 may be directly connected to first controller 7 without attaching the gyro sensor unit 9 to the first controller 7. In this case, the position and the orientation of the first controller 7 may be calculated based on acceleration data outputted from the acceleration sensor 701, instead of angular velocity data outputted from the gyro sensor unit 9.

In addition, the above embodiment describes the case where an animation that does not include the player object 101 having the sword object 104 is displayed. However, an animation that includes the sword object 104 and the player object 101 may be displayed. Alternatively, an animation that does not include the sword object 104 and the player object 101 and that indicates only the trajectory of the movement of the sword object 104 may be displayed. That is, the first object (in the present embodiment, the sword object 104) may not be displayed on the liquid crystal television 2.

In addition, the above embodiment describes the case where one collision target which serves as a determination area for collision determination is set for one enemy object. However, a plurality of collision targets may be set for one enemy object such that the plurality of collision targets are placed at different positions of the one enemy object. For example, four collision targets are set for an enemy object such that the four collision targets are placed at different positions of upper, lower, right, and left positions of the enemy object.

In addition, in the above embodiment, the above game processing is realized by using one game apparatus 3. However, the present invention is not limited thereto. The above game processing may be realized by a plurality of information processing apparatuses working in a coordinated manner. That is, the function of at least one of the direction determination means, the collision determination means, and the collision processing determination means may be realized by using, for example, a server apparatus on a network other than the game apparatus 3. In this case, a game system including the game apparatus 3 and the server apparatus functions in the same manner as in the game apparatus 3 described above.

Example embodiments of present invention are applicable to: a computer-readable storage medium having stored therein a game program which is executed by a computer of a game apparatus which determines a collision between objects in a virtual game space and performs game processing in accordance with a result of the determination; a game apparatus; a game system; a game processing method; and the like.

While example embodiments of the invention have been described in detail, the foregoing description is in all aspects illustrative and not restrictive. It will be understood that numerous other modifications and variations can be devised without departing from the scope of the invention.

What is claimed is:

1. A non-transitory computer-readable storage medium having stored therein a game program which is executed by a computer of a game apparatus, which game apparatus performs game processing, based on a state signal outputted by a state detection device for detecting at least one of the position or the orientation of an input apparatus, the game program causing the computer to provide functionality comprising:
   a direction determination for determining an operation direction of the input apparatus, based on the state signal;
   a collision determination for determining whether or not a first object that acts based on the state signal in a virtual game space will collide with a determination target; and
   a collision processing determination for, if the collision determination has determined that the first object will collide with the determination target, determining whether or not to perform hitting processing for the determination target, based on the operation direction determined by the direction determination.

2. The non-transitory computer-readable storage medium having stored therein the game program according to claim 1, wherein
   the game program causes the computer to provide further functionality comprising:
      a position relation detection for detecting a position relation between the first object and the determination target in the virtual game space, and
   the collision processing determination determines whether or not to perform the hitting processing for the determination target, based on the operation direction determined by the direction determination and the position relation detected by the position relation detection.

3. The non-transitory computer-readable storage medium having stored therein the game program according to claim 2, wherein
   the game program causes the computer to provide functionality further comprising:
      a priority rank setting for, if the collision determination has determined that the first object will collide with a plurality of determination targets, setting priority ranks for the plurality of determination targets, based on the operation direction determined by the direction determination and the position relation detected by the position relation detection, and
   the collision processing determination determines whether or not to perform the hitting processing for a determination target having the highest priority rank among the plurality of determination targets.

4. The non-transitory computer-readable storage medium having stored therein the game program according to claim 1, wherein
   the game program further causes the computer to provide functionality further comprising:
      a start determination for determining whether or not an operation of swinging the input apparatus has been started, based on the state signal, and
      the direction determination determines the operation direction of the input apparatus when the start determination has determined that an operation of swinging the input apparatus has been started.

5. The non transitory computer-readable storage medium having stored therein the game program according to claim 1, wherein
   the state detection device includes an angular velocity sensor, and
   the state signal includes angular velocity data outputted by the angular velocity sensor.

6. A game apparatus which performs game processing, based on a state signal outputted by a state detector for detecting at least one of the position or the orientation of an input apparatus, the game apparatus comprising:
   a direction determination unit configured to determine an operation direction of the input apparatus, based on the state signal;
   a collision determination unit configured to determine whether or not a first object that acts based on the state signal in a virtual game space will collide with a determination target; and
   a collision processing unit configured to determine, if the collision determination unit has determined that the first object will collide with the determination target, whether or not to perform hitting processing for the determination target, based on the operation direction determined by the direction determination unit.

7. A game system for performing game processing, the game system comprising:
   a state detector configured to detect at least one of a position or an orientation of an input apparatus and output a state signal; and
   a processing system configured to perform at least:
      a direction determination for determining an operation direction of the input apparatus, based on the state signal;
      a collision determination for determining whether or not a first object that acts based on the state signal in a virtual game space will collide with a determination target; and
      a collision processing determination for, if the collision determination has determined that the first object will collide with the determination target, determining whether or not to perform hitting processing for the determination target, based on the operation direction determined by the direction determination.

8. A game processing method for performing game processing, based on a state signal outputted by a state detector for detecting at least one of the position or the orientation of an input apparatus, the game processing method comprising:
   determining, using a processing system including at least one computer processor, an operation direction of the input apparatus, based on the state signal;
   determining whether or not a first object that acts based on the state signal in a virtual game space will collide with a determination target; and
   if it has been determined that the first object will collide with the determination target, determining whether or not to perform hitting processing for the determination target, based on the operation direction that has been determined.

9. A system comprising:
   a processor;
   storage memory having stored therein a computer program which is executed by the processor for performing processing, based on a state signal outputted by a state detection device for detecting at least one of a position or an orientation of an input apparatus, the computer program causing the system to at least:

determine an operation direction of the input apparatus based on the state signal;

determine whether or not a first object that acts based on the state signal in a virtual space will collide with a second object; and determine, if a determination is made that the first object will collide with the second object, determining whether or not to perform hitting processing for the second object, based on the determined operation direction.

10. The system according to claim 9, wherein the computer program further causes the system to:

detect a position relation between the first object and the second object in the virtual space, and determine whether or not to perform the hitting processing for the second object based on the determined operation direction and the detected position relation.

11. The system according to claim 10, wherein the computer program further causes the system to:

if a determination is made that the first object will collide with a plurality of second objects, set priority ranks for the plurality of second objects, based on the determined operation direction and the detected position relation, and determine whether or not to perform the hitting processing for a second object having the highest priority rank among the plurality of second objects.

12. The system according to claim 9, wherein the computer program further causes the system to:

determine whether or not an operation of swinging the input apparatus has been started based on the state signal, and determine the operation direction of the input apparatus when a determination has been made that the operation of swinging the input apparatus has been started.

13. The system according to claim 9, wherein the state detection device includes an angular velocity sensor, and the state signal includes angular velocity data outputted by the angular velocity sensor.

14. The system according to claim 9, wherein the storage memory is a volatile memory.

15. A method of performing processing, based on a state signal outputted by a state detection device for detecting at least one of a position or an orientation of an input apparatus, the method comprising:

determining an operation direction of the input apparatus based on the state signal;

determining whether or not a first object that acts based on the state signal in a virtual space will collide with a second object; and determining, using a computer processor, if a determination is made that the first object will collide with the second object, determining whether or not to perform hitting processing for the second object, based on the determined operation direction.

* * * * *